US009448402B2

(12) United States Patent
Akanuma et al.

(10) Patent No.: US 9,448,402 B2
(45) Date of Patent: Sep. 20, 2016

(54) OPTICAL DEFLECTION DEVICE AND IMAGE FORMING APPARATUS

(71) Applicants: Goichi Akanuma, Kanagawa (JP); Tomofumi Kitazawa, Kanagawa (JP)

(72) Inventors: Goichi Akanuma, Kanagawa (JP); Tomofumi Kitazawa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/454,147

(22) Filed: Aug. 7, 2014

(65) Prior Publication Data

US 2015/0062683 A1    Mar. 5, 2015

(30) Foreign Application Priority Data

Aug. 28, 2013  (JP) .................................. 2013-176188

(51) Int. Cl.
*G02B 26/08* (2006.01)
*G03G 15/04* (2006.01)

(52) U.S. Cl.
CPC ..... *G02B 26/0858* (2013.01); *G03G 15/04036* (2013.01)

(58) Field of Classification Search
CPC ............. B41J 2/44; B41J 2/442; B41J 2/45; B41J 2/451; B41J 2/47; B41J 2/471; G02B 26/0858; G03G 15/04036
USPC ....................................................... 347/132
See application file for complete search history.

(56) References Cited

U.S. PATENT DOCUMENTS

| 6,449,079 | B1 | 9/2002 | Herrmann |
| 7,542,200 | B1* | 6/2009 | Stowe ...................... B41J 2/471 359/237 |
| 7,889,416 | B1 | 2/2011 | Stowe |
| 8,174,750 | B2 | 5/2012 | Akanuma et al. |
| 8,395,834 | B2 | 3/2013 | Akanuma et al. |
| 2007/0146858 | A1 | 6/2007 | Matsuda |
| 2009/0185253 | A1* | 7/2009 | Tani .................... G02B 26/0858 359/221.2 |
| 2010/0195180 | A1 | 8/2010 | Akanuma et al. |
| 2011/0292479 | A1 | 12/2011 | Hiraoka et al. |
| 2012/0033279 | A1* | 2/2012 | Furukawa .......... G02B 26/0833 359/199.1 |
| 2012/0250127 | A1 | 10/2012 | Naono |
| 2012/0275000 | A1 | 11/2012 | Honda |
| 2013/0128328 | A1 | 5/2013 | Honda et al. |

FOREIGN PATENT DOCUMENTS

| DE | 198 57 946 C1 | 1/2000 |
| JP | 2000-235152 | 8/2000 |
| JP | 2002-116403 | 4/2002 |

(Continued)

OTHER PUBLICATIONS

Fujii, MachineTranslationofJP 2012058527 A, 2012.*

(Continued)

*Primary Examiner* — Geoffrey Mruk
*Assistant Examiner* — Scott A Richmond
(74) *Attorney, Agent, or Firm* — Oblon, McClelland, Maier & Neustadt, L.L.P

(57) ABSTRACT

An optical deflection device includes a mirror having a reflection face for deflecting light that enters the reflection face; and a support member to support the mirror including a torsion bar having one end being continuously connected to the mirror; a beam being continuously connected to another end of the torsion bar; and a plurality of piezoelectric elements disposed on the beam including a first piezoelectric element and a second piezoelectric element.

17 Claims, 30 Drawing Sheets

(56) References Cited

FOREIGN PATENT DOCUMENTS

| | | |
|---|---|---|
| JP | 2006-184603 | 7/2006 |
| JP | 2009-169325 | 7/2009 |
| JP | 2011-197253 | 10/2011 |
| JP | 2012-58527 A | 3/2012 |
| JP | 2012058527 A * | 3/2012 |
| JP | 2013-195479 | 9/2013 |

OTHER PUBLICATIONS

Fujii, MachineTranslationofJP2012-058527A, 2012.*
Partial European Search Report issued Jan. 30, 2015 in Patent Application No. 14182510.9.
Extended European Search Report issued Apr. 23, 2015 in Patent Application No. 14182510.9.

* cited by examiner

OPTICAL DEFLECTION DEVICE AND IMAGE FORMING APPARATUS

This application claims priority pursuant to 35 U.S.C. §119(a) to Japanese Patent Application No. 2013-176188, filed on Aug. 28, 2013 in the Japan Patent Office, the disclosures of which are incorporated by reference herein in their entirety.

BACKGROUND

1. Technical Field

The present invention relates to an optical deflection device to deflect light, and an image forming apparatus having the optical deflection device.

2. Background Art

An optical deflection device is typically configured with a mirror having a reflection face, a torsion bar having one end being continuously connected to the mirror via a detection-use piezoelectric element, a drive-use piezoelectric element having one end being continuously connected to another end of the torsion bar, and a support member being connected to another end of the drive-use piezoelectric element, for example, as disclosed in JP-2009-169325-A.

In this optical deflection device, voltage is applied to the drive-use piezoelectric element to deform the drive-use piezoelectric element to deflect or oscillate the mirror via the torsion bar, in which the detection-use piezoelectric element deforms due to deflection or oscillation of the mirror, and then generates voltage corresponding to a deflection angle of the mirror, in which the deflection angle of the mirror is detected based on this voltage.

However, as to the above mentioned optical deflection device, due to the deformation of the detection-use piezoelectric element, flatness of the reflection face of the mirror may deteriorate.

SUMMARY

In one aspect of the present invention, an optical deflection device is devised. The optical deflection device includes a mirror having a reflection face for deflecting light that enters the reflection face; and a support member to support the mirror including: a torsion bar having one end being continuously connected to the mirror; a beam being continuously connected to another end of the torsion bar; and a plurality of piezoelectric elements disposed on the beam including a first piezoelectric element and a second piezoelectric element.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

Figure 1:
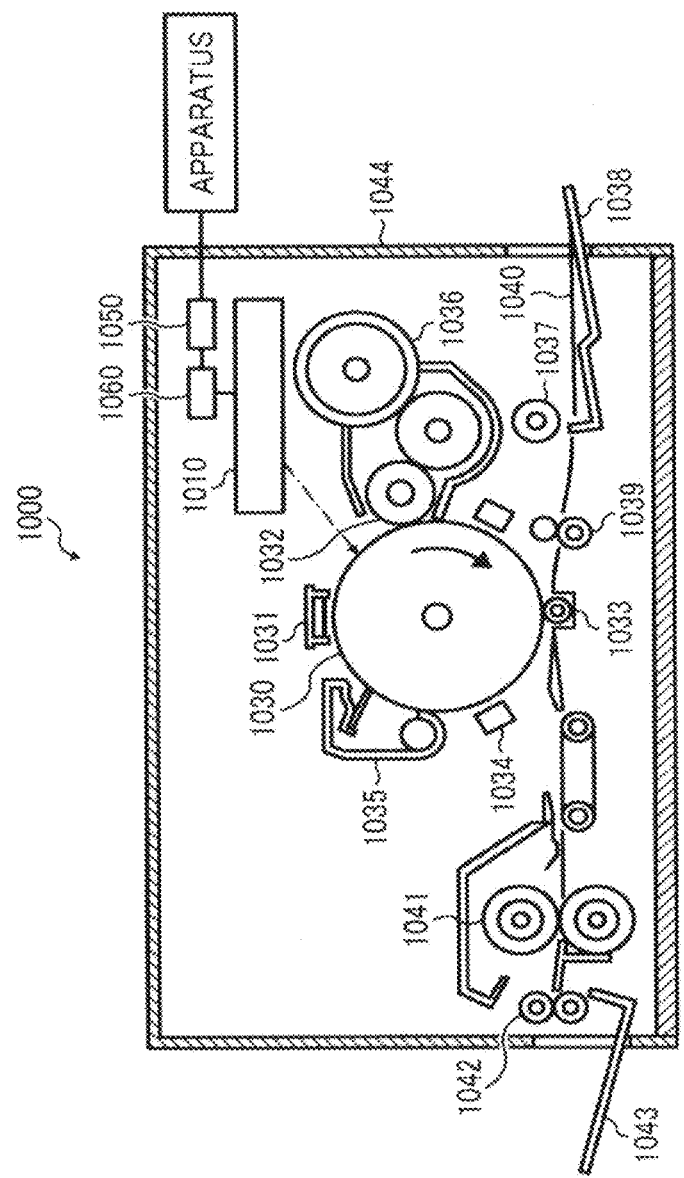
FIG. 1 is a schematic configuration of a laser printer according to a first example embodiment.

The accompanying drawings are intended to depict exemplary embodiments of the present invention and should not be interpreted to limit the scope thereof. The accompanying drawings are not to be considered as drawn to scale unless explicitly noted, and identical or similar reference numerals designate identical or similar components throughout the several views.

DETAILED DESCRIPTION

A description is now given of exemplary embodiments of the present invention. It should be noted that although such terms as first, second, etc. may be used herein to describe various elements, components, regions, layers and/or sections, it should be understood that such elements, components, regions, layers and/or sections are not limited thereby because such terms are relative, that is, used only to distinguish one element, component, region, layer or section from another region, layer or section. Thus, for example, a first element, component, region, layer or section discussed below could be termed a second element, component, region, layer or section without departing from the teachings of the present invention.

In addition, it should be noted that the terminology used herein is for the purpose of describing particular embodiments only and is not intended to be limiting of the present invention. Thus, for example, as used herein, the singular forms "a", "an" and "the" are intended to include the plural forms as well, unless the context clearly indicates otherwise. Moreover, the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Furthermore, although in describing views shown in the drawings, specific terminology is employed for the sake of clarity, the present disclosure is not limited to the specific terminology so selected and it is to be understood that each specific element includes all technical equivalents that have a similar function, operate in a similar manner, and achieve a similar result. Referring now to the drawings, an apparatus or system according to an example embodiment is described hereinafter.

(First Example Embodiment)

A description is given of a first example embodiment with reference to FIG. 1 to FIG. 9. FIG. 1 illustrates a schematic configuration of a laser printer 1000, which is an example of an image forming apparatus according to the first example embodiment.

The laser printer 1000 includes, for example, an optical scanning unit 1010, a photoconductor drum 1030, a charger 1031, a development roller 1032, a transfer charger 1033, a de-charger unit 1034, a cleaning unit 1035, a toner cartridge 1036, a sheet feed roller 1037, a sheet feed tray 1038, the registration roller 1039, a fusing roller 1041, a sheet ejection roller 1042, a sheet ejection tray 1043, a communication control unit 1050, and a printer control unit 1060 that controls such units as a whole. These units are encased in given positions in a printer housing 1044.

The communication control unit 1050 controls bidirectional communication with other apparatus such as a personal computer via a network.

The photoconductor drum 1030 is a cylindrical member having formed with a photoconductive layer on its surface. The surface of the photoconductor drum 1030 can be used as face scanned by light such as laser (hereinafter, referred to a scanned face). The photoconductor drum 1030 rotates in a direction shown by an arrow of FIG. 1.

The charger 1031, the development roller 1032, the transfer charger 1033, the de-charger unit 1034 and the cleaning unit 1035 are disposed near the surface of the photoconductor drum 1030, which are disposed along a rotation direction of the photoconductor drum 1030 with an order of the charger 1031→the development roller 1032→the transfer charger 1033→the de-charger unit 1034→the cleaning unit 1035.

The charger 1031 charges the surface of the photoconductor drum 1030 evenly.

The optical scanning unit 1010 scans the surface of the photoconductor drum 1030, charged by the charger 1031 using a laser beam modulated based on image information received from an external apparatus such as a personal computer (PC) to form a latent image corresponding to the image information on the surface of the photoconductor drum 1030. With a rotation of the photoconductor drum 1030, the latent image proceeds to a direction of the development roller 1032. The optical scanning unit 1010 will be described later.

The toner cartridge 1036 stores toner to be supplied to the development roller 1032.

The development roller 1032 provides toner, supplied from the toner cartridge 1036, to the latent image formed on the surface of the photoconductor drum 1030 to develop the image information. The toner-adhered latent image (hereinafter, toner image) proceeds to a direction of the transfer charger 1033 with a rotation of the photoconductor drum 1030.

The sheet feed tray 1038 stores recording sheet 1040. The sheet feed roller 1037 is disposed near the sheet feed tray 1038. The sheet feed roller 1037 picks the recording sheet 1040 one by one from the sheet feed tray 1038, and transports to the registration roller 1039.

The registration roller 1039 holds the recording sheet 1040 transported from the sheet feed roller 1037 for a given time, and feeds the recording sheet 1040 to a gap between the photoconductor drum 1030 and the transfer charger 1033 in line with a rotation of the photoconductor drum 1030.

The transfer charger 1033 is applied with voltage having a polarity opposite to toner so that the toner on the surface of the photoconductor drum 1030 can be electrically attracted to the recording sheet 1040, with which the toner image on the surface of the photoconductor drum 1030 is transferred to the recording sheet 1040. The recording sheet 1040 transferred with the toner image is transported to the fusing roller 1041.

The fusing roller 1041 applies heat and pressure to the recording sheet 1040 to fuse toner on the recording sheet 1040. The recording sheet 1040 fused with toner is transported to the sheet ejection tray 1043 via the sheet ejection roller 1042, and stacked on the sheet ejection tray 1043.

The de-charger unit 1034 de-charges the surface of the photoconductor drum 1030.

The cleaning unit 1035 removes toner remaining (remaining toner) on the surface of the photoconductor drum 1030. After removing the remaining toner, the surface of the photoconductor drum 1030 returns a position facing the charger 1031.

Figure 2:
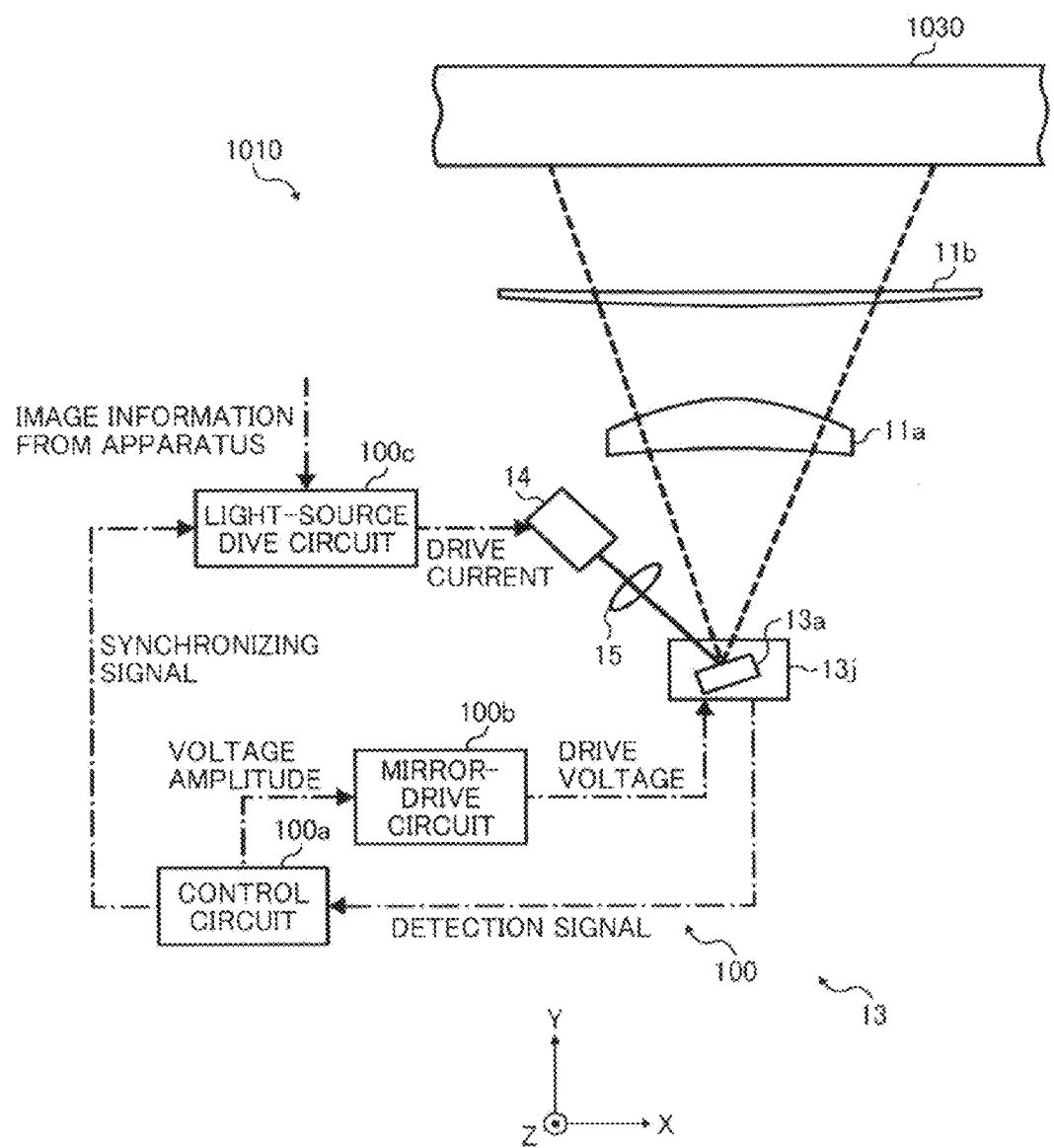
FIG. 2 is a schematic configuration of an optical scanning apparatus of FIG. 1.

A description is given of the optical scanning unit 1010. As illustrated in FIG. 2, the optical scanning unit 1010 includes, for example, a light source 14, a coupling lens 15, an optical deflection device 13 having a deflection mirror 13a, a first scanning lens 11a, and the second scanning lens 11b, which are attached at given positions in a housing.

Hereinafter, XYZ three dimensional orthogonal coordinate system shown in FIG. 2 is used for description, in which X-axis direction is the main scanning direction, and Z-axis direction is the sub-scanning direction.

The light source 14 uses, for example, a laser diode. The light source 14 emits a laser beam in a direction parallel to XY-plane.

The coupling lens 15 is disposed on a light path of the laser beam emitted from the light source 14, and sets the laser beam to substantially parallel light.

The optical deflection device 13 is disposed at a given position to set the deflection mirror 13a on the light path of laser beam that has passed the coupling lens 15. The deflection mirror 13a is deflected or oscillated about the axis parallel to Z-axis to reflect and deflect the laser beam.

The first scanning lens 11a is disposed on a light path of the laser beam deflected by the optical deflection device 13.

The second scanning lens 11b is disposed on a light path of the laser beam passing the first scanning lens 11a. Then, the laser beam passing the second scanning lens 11b is irradiated on the surface of the photoconductor drum 1030 to form a light spot. The light spot moves along the long-side direction of the photoconductor drum 1030 in line with deflection or oscillation of the deflection mirror 13a, which means the light spot scans on the photoconductor drum 1030. The moving direction of the light spot is the main scanning direction, and the rotation direction of the photoconductor drum 1030 is the sub-scanning direction.

An optical system disposed on the light path between the deflection mirror 13a and the photoconductor drum 1030 is referred to as a scan-optical system. For example, the scan-optical system includes the first scanning lens 11a and the second scanning lens 11b. Further, at least one reflection mirror can be disposed at any one of the light path between the first scanning lens 11a and the second scanning lens 11b, and the light path between the second scanning lens 11b and the photoconductor drum 1030.

Figure 3:
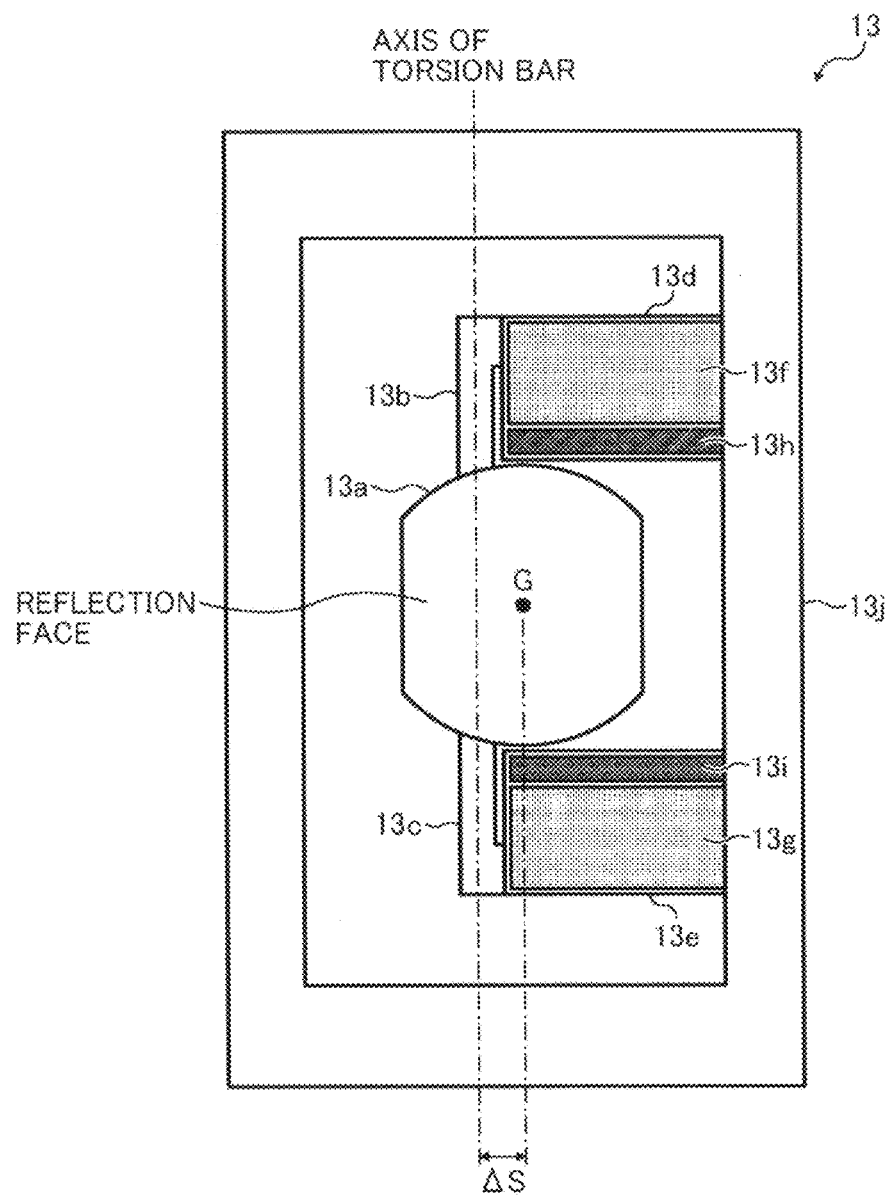
FIG. 3 is a cross-sectional view of an optical deflection device of the optical deflection device of FIG. 2.

A description is given of the optical deflection device 13. FIG. 3 is a cross-sectional view of the optical deflection device 13 cut along YZ-plane. The optical deflection device 13 includes, for example, the deflection mirror 13a, a pair of torsion bars 13b, 13c, a pair of cantilevers 13d, 13e, a pair of drive-use piezoelectric elements 13f, 13g, a pair of the detection-use piezoelectric elements 13h, 13i, a frame 13j that supports the pair of cantilevers 13d, 13e, and a deflection control unit 100 (see FIG. 2). As to the optical deflection device 13, each component can be prepared collectively by using micro electro mechanical systems (MEMS) process. Except the deflection control unit 100 of the optical deflection device 13, the optical deflection device 13 can be formed by preparing a plurality of moveable parts (elastically deformable parts) by removing a part of one silicon substrate parallel to YZ-plane, and providing a piezoelectric element to each of the moveable parts.

The frame 13j has, for example, a rectangular frame shape as illustrated in FIG. 3.

The deflection mirror 13a has a reflection face parallel to Z-axis, which is formed, for example, at −X side face of the center of the silicon substrate by using a thin metal film such as aluminum, gold, silver or the like. In this example case, the deflection mirror 13a has a symmetrical shape about a virtual plane crossing the center of gravity G and parallel to XY-plane.

The torsion bar 13b is, for example, a twist-able bar spring having an axis line parallel to Z-axis. The −Z side end of the torsion bar 13b is being continuously connected to the +Z side end of the deflection mirror 13a. For example, the axis line of the torsion bar 13b is at a position shifted to +Y side for ΔS from a straight line parallel to Z-axis and crossing the center of gravity G of the deflection mirror 13a as illustrated in FIG. 3.

The torsion bar 13c is, for example, a twist-able bar spring having an axis line aligned to the axis line of the torsion bar 13b. The +Z side end of the torsion bar 13c is being continuously connected to −Z side end of the deflection mirror 13a, which means the torsion bar 13c is disposed symmetrically with the torsion bar 13b about the virtual plane.

The cantilever 13d is, for example, a rectangular plate having the long side direction in Y-axis direction and parallel to YZ plane. While the cantilever 13d is positioned at +Z side of the deflection mirror 13a, the +Z side portion at +Y side end face of the cantilever 13d is being continuously connected to −Y side face at +Z side end of the torsion bar 13b, which means the cantilever 13d is positioned at −Y side of the torsion bar 13b by setting the right angle with the torsion bar 13b.

The cantilever 13e is, for example, a rectangular plate having the long side direction in Y-axis direction and parallel to YZ plane. While the cantilever 13e is positioned at −Z side of the deflection mirror 13a, the −Z side portion at +Y side end face of the cantilever 13e is being continuously connected to −Y side face at −Z side end of the torsion bar 13c, which means the cantilever 13e is positioned at −Y side of the torsion bar 13c by setting the right angle with the torsion bar 13c. Therefore, the cantilever 13e is disposed symmetrically with the cantilever 13d about the virtual plane.

The −Y side end face of each of the cantilever is being continuously connected to an internal wall at −Y side of the frame 13j. Therefore, as to each of the cantilevers, −Y side end of the cantilever is a fixed end fixed to the internal wall, and +Y side end of the cantilever is a free end, which is continued to the torsion bar. In other words, each of the cantilevers is supported by the frame 13j at the fixed end of the cantilever.

Figure 4A:
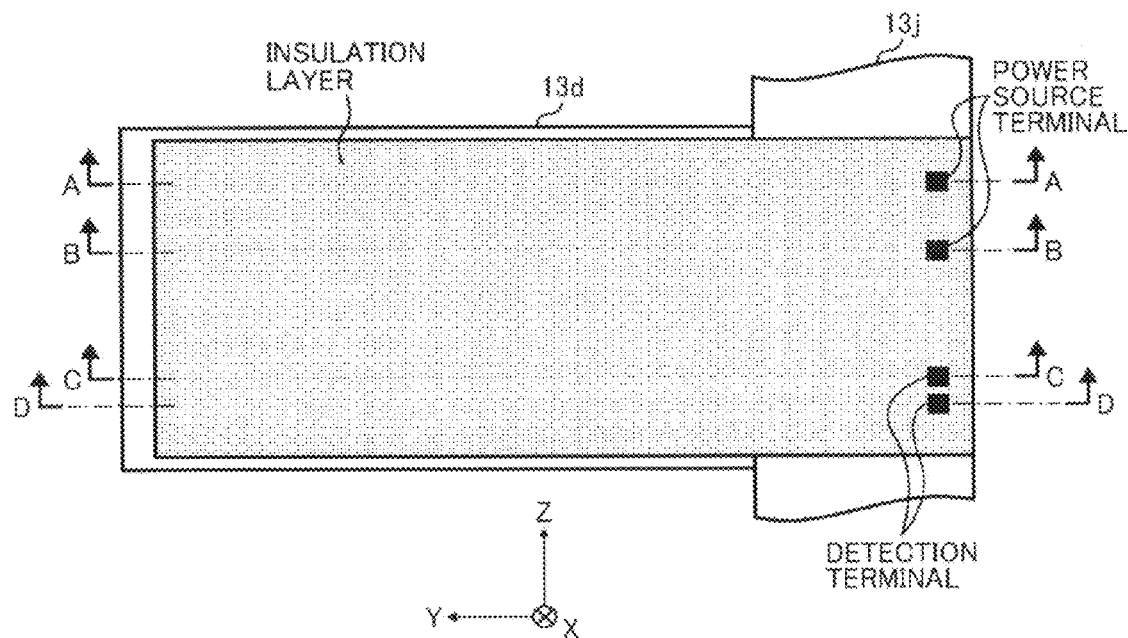
FIG. 4A is a view of a drive-use piezoelectric element and a detection-use piezoelectric element of the optical deflection device when an insulation layer is formed.
Figure 4B:
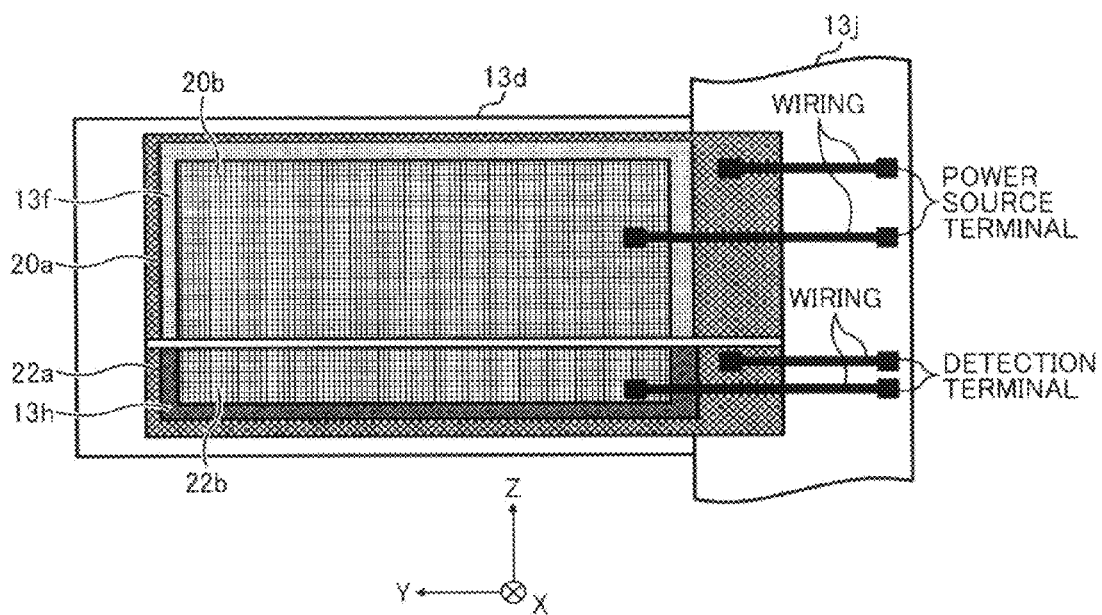
FIG. 4B is a view of a drive-use piezoelectric element and a detection-use piezoelectric element of the optical deflection device when an insulation layer is removed.
Figure 5A:
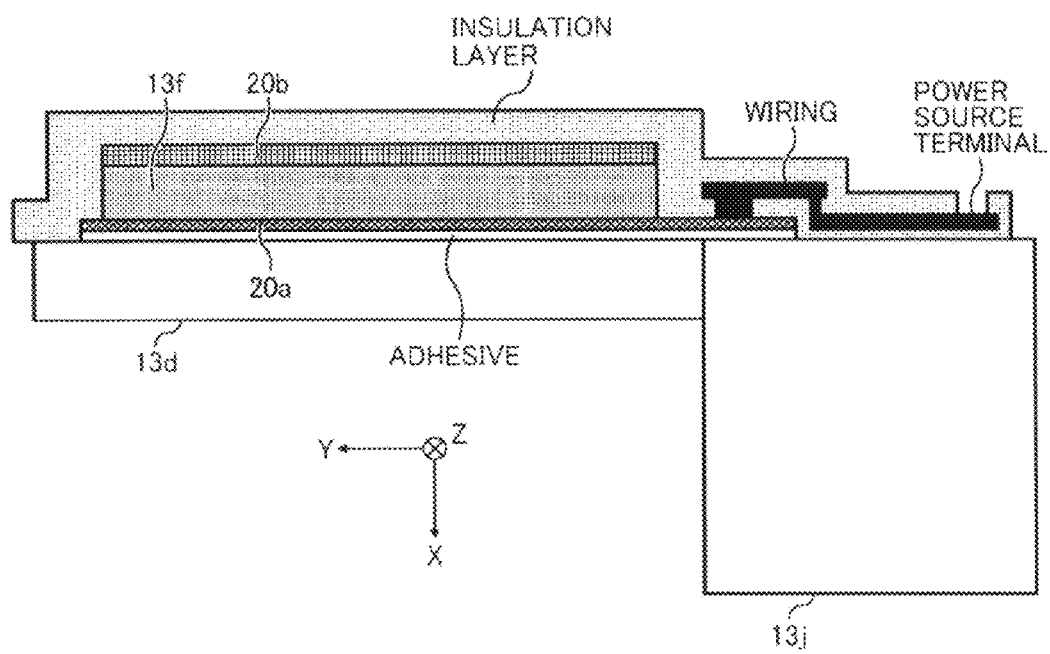
FIG. 5A is a cross-sectional view cut at line A-A of FIG. 4A.
Figure 5B:
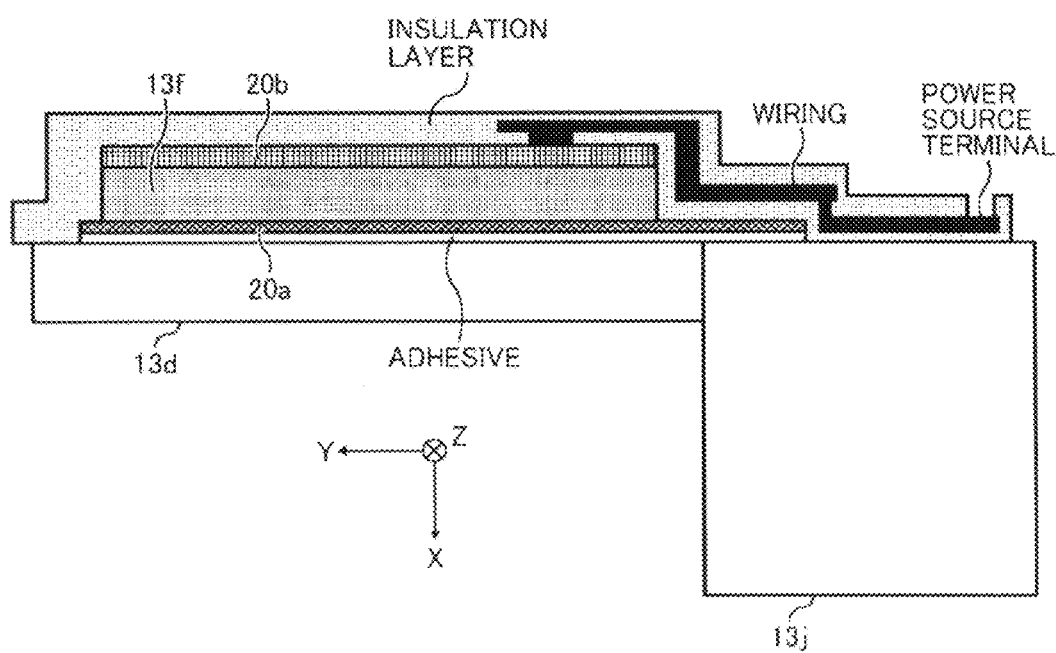
FIG. 5B is a cross-sectional view cut at line B-B of FIG. 4A.

FIG. 4A is a view viewed from −X side when an insulation layer is formed on the cantilever 13d, the drive-use piezoelectric element 13f and the detection-use piezoelectric element 13h. In FIG. 4A, the drive-use piezoelectric element 13f and the detection-use piezoelectric element 13h are behind the +X side of the insulation layer. FIG. 4B is a view viewed from −X side when the insulation layer formed on the cantilever 13d, the drive-use piezoelectric element 13f and the detection-use piezoelectric element 13h (FIG. 4A) is removed. FIG. 5A is a cross-sectional view cut at line A-A of FIG. 4A, and FIG. 5B is a cross-sectional view cut at line B-B of FIG. 4A.

The drive-use piezoelectric element 13f is, for example, made of piezoelectric material such as PZT (lead zirconate titanate), and the drive-use piezoelectric element 13f is a rectangular plate having set the long side direction to Y-axis direction parallel to YZ plane. The drive-use piezoelectric element 13f is constructed to +Z side portion of −X side face of the cantilever 13d via adhesive and a drive-use electrode 20a, which is a flexible plate parallel to YZ plane (see FIG. 5A and FIG. 5B).

Further, −X side face of the drive-use piezoelectric element 13f is bonded to a drive-use electrode 20b, which is a flexible plate parallel to YZ plane (see FIG. 5A and FIG.

5B). Therefore, the drive-use piezoelectric element 13f is sandwiched between the pair of the drive-use electrodes 20a and 20b in X-axis direction. Each of the drive-use electrodes 20a and 20b is connected to different power source terminals having different polarity via wiring, and voltage can be applied between the pair of the drive-use electrodes 20a and 20b in X-axis direction. In this example case, Y-axis direction size of the drive-use piezoelectric element 13f is shorter than the cantilever 13d for some length, and Z-axis direction size of the drive-use piezoelectric element 13f is about ⅔ to ¾ of the cantilever 13d (see FIG. 4B).

The drive-use piezoelectric element 13g is, for example, made of piezoelectric material such as PZT (lead zirconate titanate), and the drive-use piezoelectric element 13g is a rectangular plate having set the long side direction to Y-axis direction parallel to YZ plane. The drive-use piezoelectric element 13g is constructed to −Z side portion of −X side face of the cantilever 13e via adhesive and a drive-use electrode, which is a flexible plate parallel to YZ plane.

Further, −X side face of the drive-use piezoelectric element 13g is bonded to a drive-use electrode, which is a flexible plate parallel to YZ plane. Therefore, the drive-use piezoelectric element 13g is sandwiched between the pair of the drive-use electrodes in X-axis direction. Each of the drive-use electrodes is connected to different power source terminals having different polarity via wiring, and voltage can be applied between the pair of the drive-use electrodes. In this example case, Y-axis direction size of the drive-use piezoelectric element 13g is shorter than the cantilever 13e for some length, and Z-axis direction size of the drive-use piezoelectric element 13g is about ⅔ to ¾ of the cantilever 13e.

A position of the deflection mirror 13a shown in FIG. 3 is referred to a neutral position. If positive voltage is applied between the pair of the drive-use electrodes sandwiching the each of the drive-use piezoelectric elements when the deflection mirror 13a at the neutral position, the drive-use piezoelectric element is expands in a face direction due to electrostrictive effect, and the cantilever integrated with the drive-use piezoelectric element warps along XY-plane, with which torque in one direction about the axis line effects to the torsion bar being continuously connected to the cantilever. With this configuration, the torsion bar is twisted in the one direction about the axis line, and the deflection mirror 13a rotates in one direction about the axis line of the torsion bar.

If negative voltage is applied between the pair of the drive-use electrodes sandwiching the each of the drive-use piezoelectric elements when the deflection mirror 13a at the neutral position, the drive-use piezoelectric element shrinks in the face direction due to electrostrictive effect, and the cantilever integrated with the drive-use piezoelectric element warps along XY-plane, with which torque in another one direction about the axis line effects to the torsion bar being continuously connected to the cantilever. With this configuration, the torsion bar is twisted in another one direction about the axis line, and the deflection mirror 13a rotates in another one direction about the axis line of the torsion bar.

By applying alternating voltage having a given amplitude between the pair of the drive-use electrodes sandwiching each of the drive-use piezoelectric elements, the deflection mirror 13a can be deflected or oscillated with the given amplitude about the axis line of the torsion bar and the neutral position as a center. In this configuration, if frequency of alternating voltage is set near the resonance frequency that occurs a resonance mode for twisting about the axis line of the torsion bar, the deflection mirror 13a can be deflected or oscillated with a greater amplitude efficiently (i.e., lower power consumption).

Each of the drive-use piezoelectric elements, and each of the cantilevers, constructed to the drive-use piezoelectric element, can be used to deflect or oscillate the deflection mirror 13a about the axis line of the torsion bar via the torsion bar. This structure is the unimorph structure for the drive-use piezoelectric element.

Figure 6A:
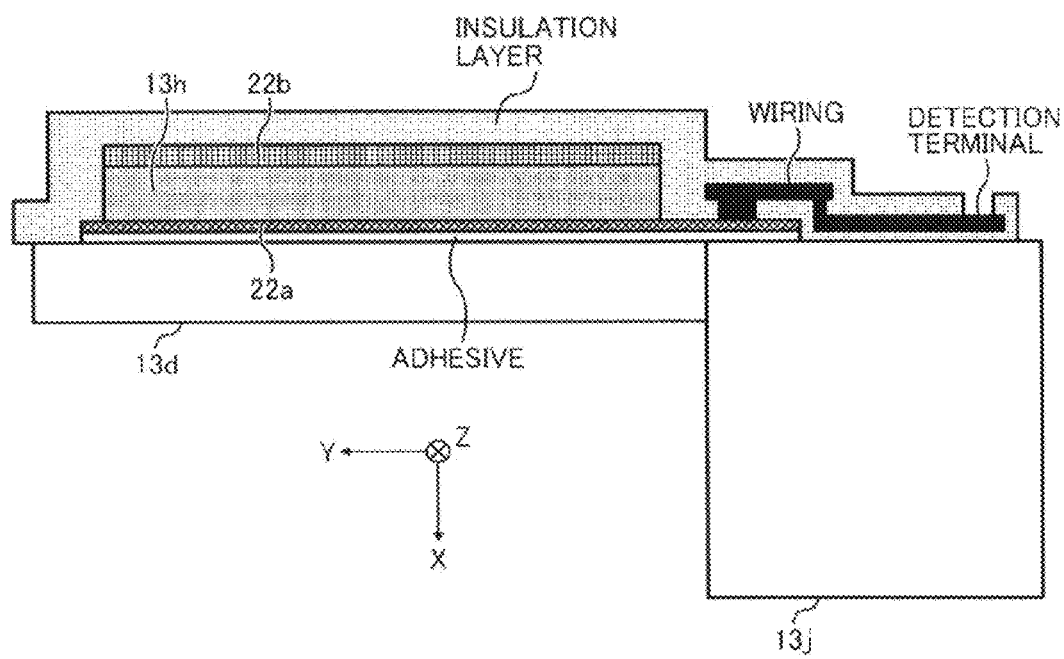
FIG. 6A is a cross-sectional view cut at line C-C of FIG. 4A.
Figure 6B:
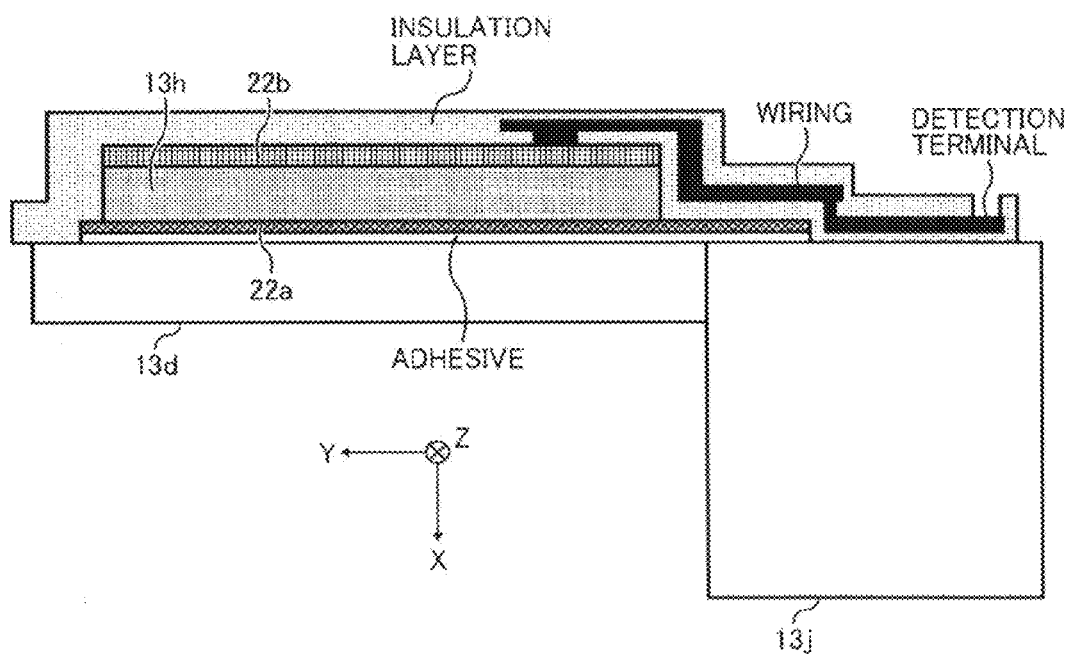
FIG. 6B is a cross-sectional view cut at line D-D of FIG. 4A.

FIG. 6A is a cross-sectional view cut at line C-C of FIG. 4A, and FIG. 6B is a cross-sectional view cut at line D-D of FIG. 4A.

The detection-use piezoelectric element 13h is, for example, made of piezoelectric material such as PZT (lead zirconate titanate), and the detection-use piezoelectric element 13h is a rectangular plate having set the long side direction set to Y-axis direction parallel to YZ plane. The detection-use piezoelectric element 13h is constructed to −Z side portion of −X side face of the cantilever 13d via adhesive and a detection-use electrode 22a, which is a plate parallel to YZ plane (see FIG. 6A and FIG. 6B).

The detection-use piezoelectric element 13h is disposed at −Z side of the drive-use piezoelectric element 13f. The detection-use piezoelectric element 13h is insulated with the drive-use piezoelectric element 13f. Further, −X side face of the detection-use piezoelectric element 13h is bonded to a detection-use electrode 22b, which is a plate parallel to YZ plane (see FIG. 6A and FIG. 6B). Therefore, the detection-use piezoelectric element 13h is sandwiched between a pair of the detection-use electrodes 22a and 22b in X-axis direction. Each of the detection-use electrodes 22a and 22b is connected to different detection terminals via wiring. In this configuration, Y-axis direction size of the detection-use piezoelectric element 13h is shorter than the cantilever 13d for some length, and X-axis direction size of the detection-use piezoelectric element 13h is about ⅕ to ¼ of the cantilever 13d (see FIG. 4B). Further, the detection-use electrode 22a is insulated with the drive-use electrode 20a, and the detection-use electrode 22b is insulated with the drive-use electrode 20b.

The detection-use piezoelectric element 13i is, for example, made of piezoelectric material such as PZT (lead zirconate titanate), and the detection-use piezoelectric element 13i is a rectangular plate having set the long side direction to Y-axis direction parallel to YZ plane. The detection-use piezoelectric element 13i is constructed to +Z side portion of −X side face of the cantilever 13e via adhesive and a detection-use electrode, which is a plate parallel to YZ plane.

The detection-use piezoelectric element 13i is disposed at +Z side of the drive-use piezoelectric element 13g. The detection-use piezoelectric element 13i is insulated with the drive-use piezoelectric element 13g. Further, −X side face of the detection-use piezoelectric element 13i is bonded to a detection-use electrode, which is a plate parallel to YZ plane. Therefore, the detection-use piezoelectric element 13i is sandwiched between the pair of the detection-use electrodes in X-axis direction. Each of the detection-use electrodes is connected to different detection terminals via wiring. In this configuration, Y-axis direction size of the detection-use piezoelectric element 13i is shorter than the cantilever 13e for some length, and X-axis direction size of the detection-use piezoelectric element 13i is about ⅕ to ¼ of the cantilever 13e.

Further, the above mentioned wiring is for example, made of metal such as aluminum, and the wiring is wired with a shorter distance as much as possible.

In this configuration, when each of the drive-use piezoelectric elements expands in the face direction, and the cantilever integrated with the drive-use piezoelectric element warps along XY-plane, the detection-use piezoelectric element integrated with the cantilever expands in the face direction, with which, for example, positive voltage corresponding a deflection angle of the deflection mirror 13*a* from the neutral position, corresponding to a warp amount of the cantilever, occurs between the pair of the detection-use electrodes.

By contrast, when each of the drive-use piezoelectric elements shrinks in the face direction, and the cantilever integrated with the drive-use piezoelectric element warps along XY-plane, the detection-use piezoelectric element integrated with the cantilever shrinks in the face direction, with which, for example, negative voltage corresponding a deflection angle of the deflection mirror 13*a* from the neutral position, corresponding to a warp amount of the cantilever, occurs between the pair of the detection-use electrodes.

In the above described configuration, each the detection-use piezoelectric elements and the cantilever integrated with the detection-use piezoelectric element configure a detection-use piezoelectric element having the unimorph structure to detect the deflection angle of the deflection mirror 13*a*, which is position information about Z axis. The voltage signal (detection signal) from each of the detection-use piezoelectric elements is output to a control circuit 100*a*, to be described later, via, for example, a signal amplification circuit.

In the above described configuration, the support member includes a pair of the torsion bars 13*b*, 13*c*, a pair of the cantilevers 13*d*, 13*e*, the frame 13*j*, a pair of the drive-use piezoelectric elements 13*f*, 13*g*, and a pair of the detection-use piezoelectric elements 13*h*, 13*i*, which can collectively support the deflection mirror 13*a*.

The above described multi-layered structure including the cantilever, the drive-use electrode, the detection-use electrode, the drive-use piezoelectric element, the detection-use piezoelectric element constructed to the cantilever via adhesive, and the insulation layer can be collectively prepared by using the thin film semiconductor manufacturing technology. As to the multi-layered structure, a multi-layer structure is prepared by stacking an adhesive layer made of, for example, titanium (Ti), a lower electrode layer made of for example, platinum (Pt), piezoelectric material layer made of, for example, PZT (lead zirconate titanate) (PZT layer), a upper electrode layer made of, for example, platinum (Pt) on the cantilever made of, for example, monocrystalline silicon layer with this order, and then the etching is conducted to separate the lower electrode layer, the PZT layer and the upper electrode layer into two areas, and then insulation layer is stacked to form the multi-layered structure. The PZT layer can be formed using, for example, the sputtering method, the sol-gel method or the like.

As illustrated in FIG. 2, the deflection control unit 100 includes, for example, a control circuit 100*a*, a mirror-drive circuit 100*b*, and a light-source dive circuit 100*c*.

Based on detection signals from each of the detection-use piezoelectric elements, the control circuit 100*a* outputs a synchronizing signal for synchronizing the deflection angle of the deflection mirror 13*a* and light emission timing of the light source 14 to the light-source dive circuit 100*c*.

Figure 7:
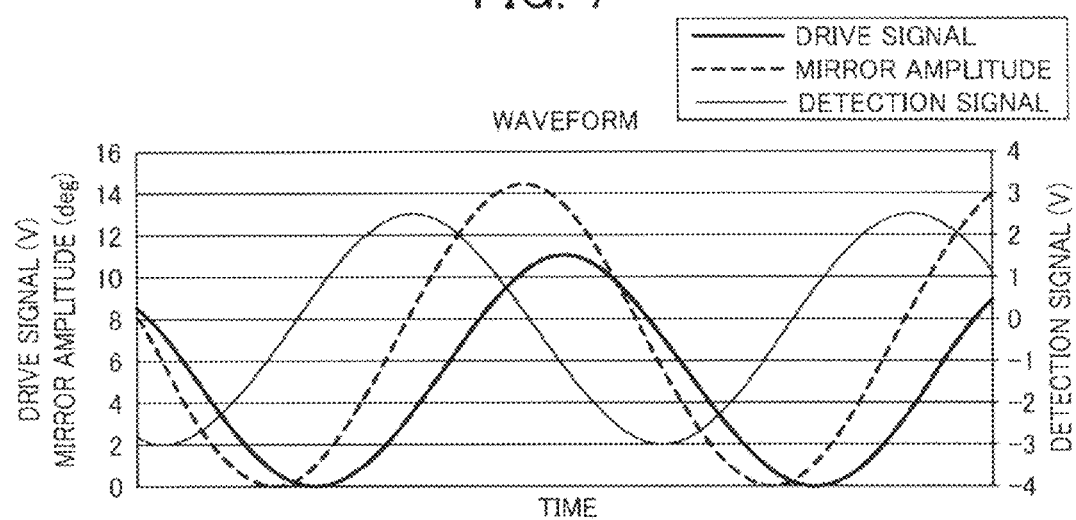
FIG. 7 is a graph of timewise waveform profiles of drive signal, detection signal and deflection angle of mirror.

FIG. 7 is a graph showing a timewise waveform profile of sine wave of alternating voltage, used as drive voltage, applied between the pair of the drive-use electrodes, a timewise waveform profile of deflection angle of the deflection mirror 13*a*, and a timewise waveform profile of detection signal from the detection-use piezoelectric element. As illustrated in FIG. 7, a given phase difference occurs between the timewise waveform profile of the deflection angle of the deflection mirror 13*a*, and the timewise waveform profile of the detection signal from the detection-use piezoelectric element. Therefore, the synchronizing signal can be generated based on the detection signal.

Further, based on the detection signal from each of the detection-use piezoelectric elements, the control circuit 100*a* sets an amplitude of alternating voltage applied to the corresponding drive-use piezoelectric element at a desired level, and outputs a setting result to the mirror-drive circuit 100*b*.

Figure 8:
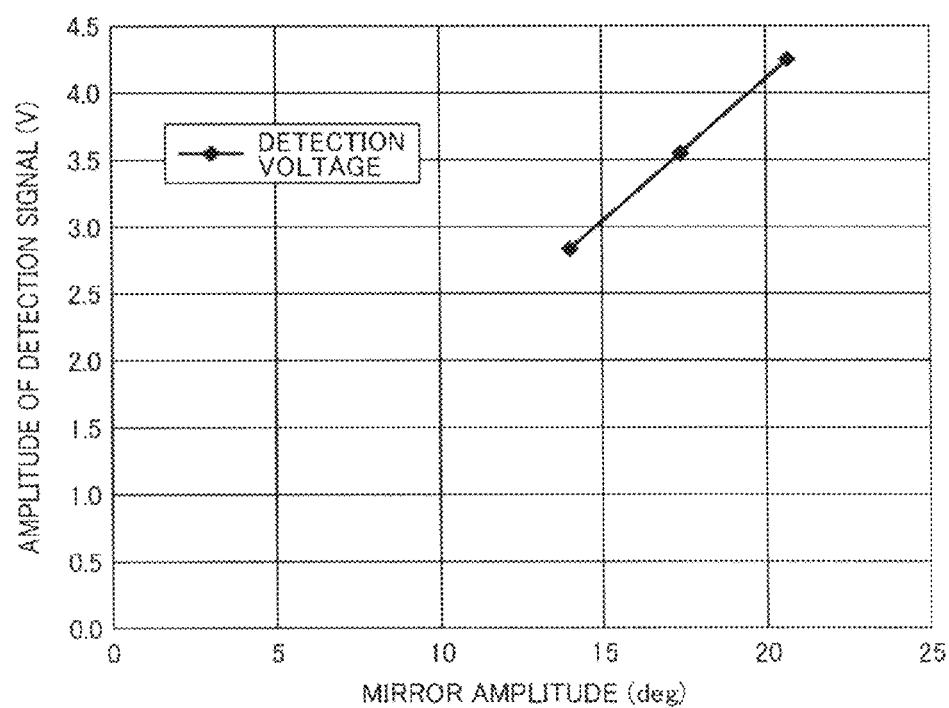
FIG. 8 is a graph showing a relationship of amplitude of a deflection mirror (mirror amplitude) and amplitude of detection signal from a detection-use piezoelectric element (detection signal amplitude)

FIG. 8 is a graph showing a relationship of amplitude of the deflection mirror 13*a* (mirror amplitude) and amplitude of the detection signal from the detection-use piezoelectric element (detection signal amplitude). As illustrated in FIG. 8, the detection signal amplitude has a proportional relationship with the mirror amplitude. Therefore, the detection signal amplitude can be used for controlling amplitude of the deflection mirror 13*a*.

The mirror-drive circuit 100*b* applies the amplitude set at the control circuit 100*a* and alternating voltage (drive voltage) having frequency near resonance frequency of the torsion bar to the pair of the drive-use electrodes sandwiching each of the drive-use piezoelectric elements with the same phase to synchronizingly control a pair of the drive-use piezoelectric elements to deflect or oscillate the deflection mirror 13*a* about the axis parallel to Z axis with a desired amplitude.

Figure 9:
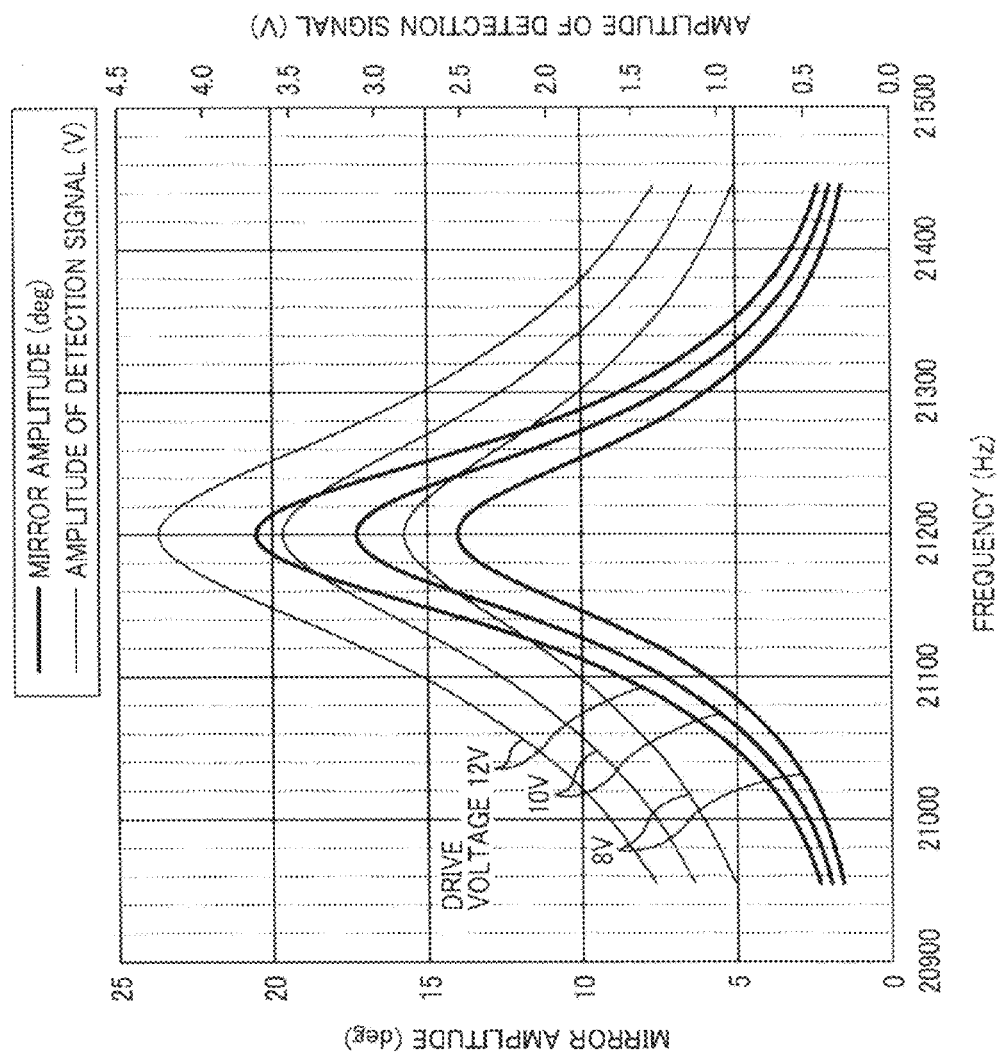
FIG. 9 is a graph showing a relationship of frequency of a torsion bar, mirror amplitude and detection signal amplitude.

FIG. 9 is a graph of frequency property profile when frequency of drive voltage is swept near the resonance frequency (e.g., 21,200 Hz) of the torsion bar. As indicated in FIG. 9, when frequency of drive voltage is near the resonance frequency of the torsion bar, the mirror amplitude and detection signal amplitude becomes the maximum.

Based on image information from an apparatus such as a personal computer (PC), the light-source dive circuit 100*c* generates an intensity-modulated drive signal (pulse signal) and converts the drive signal to a drive current. Then, based on the synchronizing signal from the control circuit 100*a*, the light-source dive circuit 100*c* determines light emission timing of the light source 14, and supplies the drive current at the light emission timing to drive the light source 14. Further, the intensity modulation can be conducted by modulating a pulse width of drive signal, or by modulating an amplitude of drive signal. Further, instead of direct intensity modulation of the light source 14, laser beam from the light source 14 can be modulated by a light modulator (i.e., external modulation).

In the above described configuration, the optical deflection device 13 includes the deflection mirror 13*a* having a reflection face, and the support member to support the deflection mirror 13*a*, and the optical deflection device 13 deflects laser beam that has entered the reflection face. Further, the support member includes the torsion bar having one end being continuously connected to the deflection mirror 13*a*, the cantilever being continuously connected to another end of the torsion bar, and the drive-use piezoelectric element and the detection-use piezoelectric element provided for the cantilever.

When voltage (e.g., sine wave of alternating voltage) is applied to the drive-use piezoelectric element, the drive-use piezoelectric element deforms such as expands or shrinks in the face direction, with which the cantilever warps, and torque about the axis line effects the torsion bar, and the deflection mirror 13*a* deflects or oscillates about the axis line of the torsion bar. Further, when the cantilever warps, the detection-use piezoelectric element deforms (i.e., expands or shrinks) in the face direction, and voltage corresponding to the deformed amount (i.e., voltage corresponding deflection angle of the deflection mirror 13a) occurs.

In this configuration, stress caused by deformation of the detection-use piezoelectric element may not occur to the deflection mirror 13a.

Therefore, as to the above described optical deflection device 13, the deflection angle of the deflection mirror 13a can be detected without deterioration of flatness of a reflection face of the deflection mirror 13a.

In contrast, as to conventional configuration, because a detection-use piezoelectric element is disposed at a position contacting a mirror unit, stress caused by deformation of the detection-use piezoelectric element occurs to the mirror unit, and flatness of a reflection face of the mirror unit deteriorates.

Further, as to the above described optical deflection device 13, because each of the torsion bar and the cantilever being continuously connected to the torsion bar are formed with the right angle with each other, torque about axis line can be efficiently transmitted from the cantilever to the torsion bar.

Further, the drive-use piezoelectric element and the detection-use piezoelectric element are disposed on −X side face of the cantilever. In this configuration, the drive-use piezoelectric element and the detection-use piezoelectric element can be formed by stacking a layer made of piezoelectric material on one face of the cantilever, and dividing the layer made of the piezoelectric material into two areas insulated with each other, in which the drive-use piezoelectric element and the detection-use piezoelectric element can be formed easily.

Further, because −X side face of the cantilever is parallel to Z-axis direction, the drive-use piezoelectric element and the detection-use piezoelectric element are arranged in Z-axis direction. In this configuration, the cantilever can be efficiently warped by deformation of the drive-use piezoelectric element, and the detection-use piezoelectric element can be efficiently deformed by the warped cantilever.

Further, each of the cantilevers is supported by the frame 13j by fixing one end of the cantilever to the frame 13j, in which a free end (i.e., freely vibration end) such as +Y side end of the cantilever can vibrate freely with respect to a fixed end such as −Y side end of the cantilever being continuously connected to the frame 13j, with which greater amplitude can be generated.

Further, because the center of gravity of the deflection mirror 13a is positioned at a position shifted from the axis line of the torsion bar, torque for deflecting or oscillating the deflection mirror 13a about the axis line of the torsion bar can be efficiently generated.

Further, compared to a rotatable multi-mirror such as a polygon mirror, power consumption for driving the optical deflection device 13 can be reduced, with which power saving can be achieved. Further, compared to the rotatable multi-mirror, wind noise when deflecting or oscillating the deflection mirror 13a of the optical deflection device 13 can be low, with which quietness (low noise) can be achieved. Further, compared to the rotatable multi-mirror, the optical deflection device 13 can be designed smaller, with which an installation space can be smaller.

Further, because the optical scanning unit 1010 includes the optical deflection device 13, the surface of the photoconductor drum 1030 can be stably scanned with higher precision.

Further, because the laser printer 1000 includes the optical scanning unit 1010, high precision image can be stably formed on a recording sheet.

Further, the drive-use piezoelectric element and the detection-use piezoelectric element can be disposed on one face of the cantilever (first case), and only the drive-use piezoelectric element disposed is disposed on an entire one face of the cantilever (second case). Compared to the second case, in the case of first case, because the drive-use piezoelectric element and the detection-use piezoelectric element are disposed on the one face of the cantilever, an area of the drive-use piezoelectric element is required to be reduced in view of an area used for the detection-use piezoelectric element.

When the same voltage is applied to the drive-use piezoelectric element of the first case and second case, amplitude of the deflection mirror of the first case becomes smaller than amplitude of the deflection mirror of the second case. Therefore, when designing the optical deflection device, it is desired to set a greater area for the drive-use piezoelectric element as much as possible and to set a smaller area for the detection-use piezoelectric element as much as possible to set greater amplitude of the deflection mirror.

Further, it is desired to obtain a greater detection signal from the detection-use piezoelectric element to detect the deflection angle of the deflection mirror with higher precision. To obtain a greater detection signal, it is desired to dispose the detection-use piezoelectric element at a position where greater deformation and greater stress occurs in twist resonance mode of the torsion bar.

Figure 10:
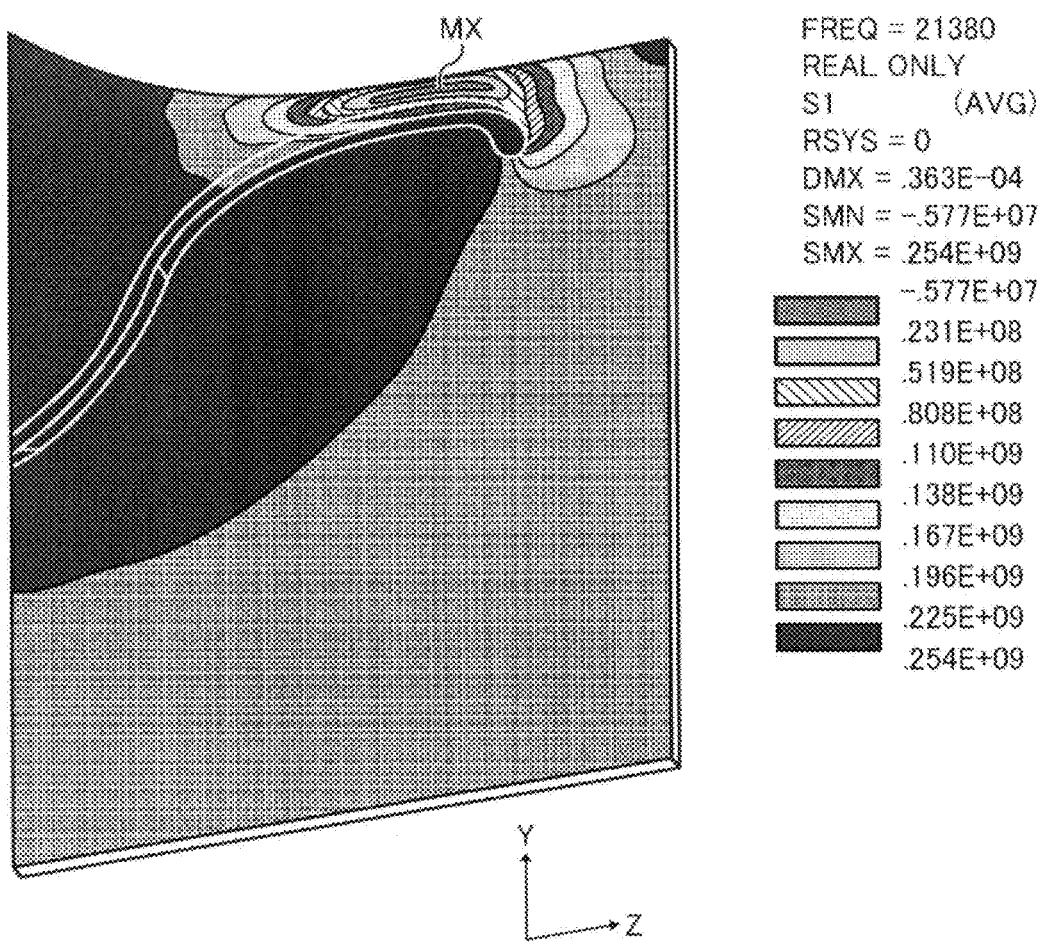
FIG. 10 is an example of stress distribution occurring to the torsion bar of the optical deflection device.

FIG. 10 is an example of stress distribution occurring to the torsion bar. As illustrated in FIG. 10, the maximum stress occurs on the torsion bar, and a greater detection signal can be obtained by disposing the detection-use piezoelectric element on the torsion bar. However, if the detection-use piezoelectric element is disposed on the torsion bar, attenuation to twisting movement of the torsion bar becomes greater, and amplitude of the deflection mirror decreases greater. Therefore, disposing the detection-use piezoelectric element on the torsion bar may not be appropriate in some cases. However, if attenuation to the twisting movement of the torsion bar is required to be greater, the detection-use piezoelectric element can be disposed on the torsion bar.

Figure 11:
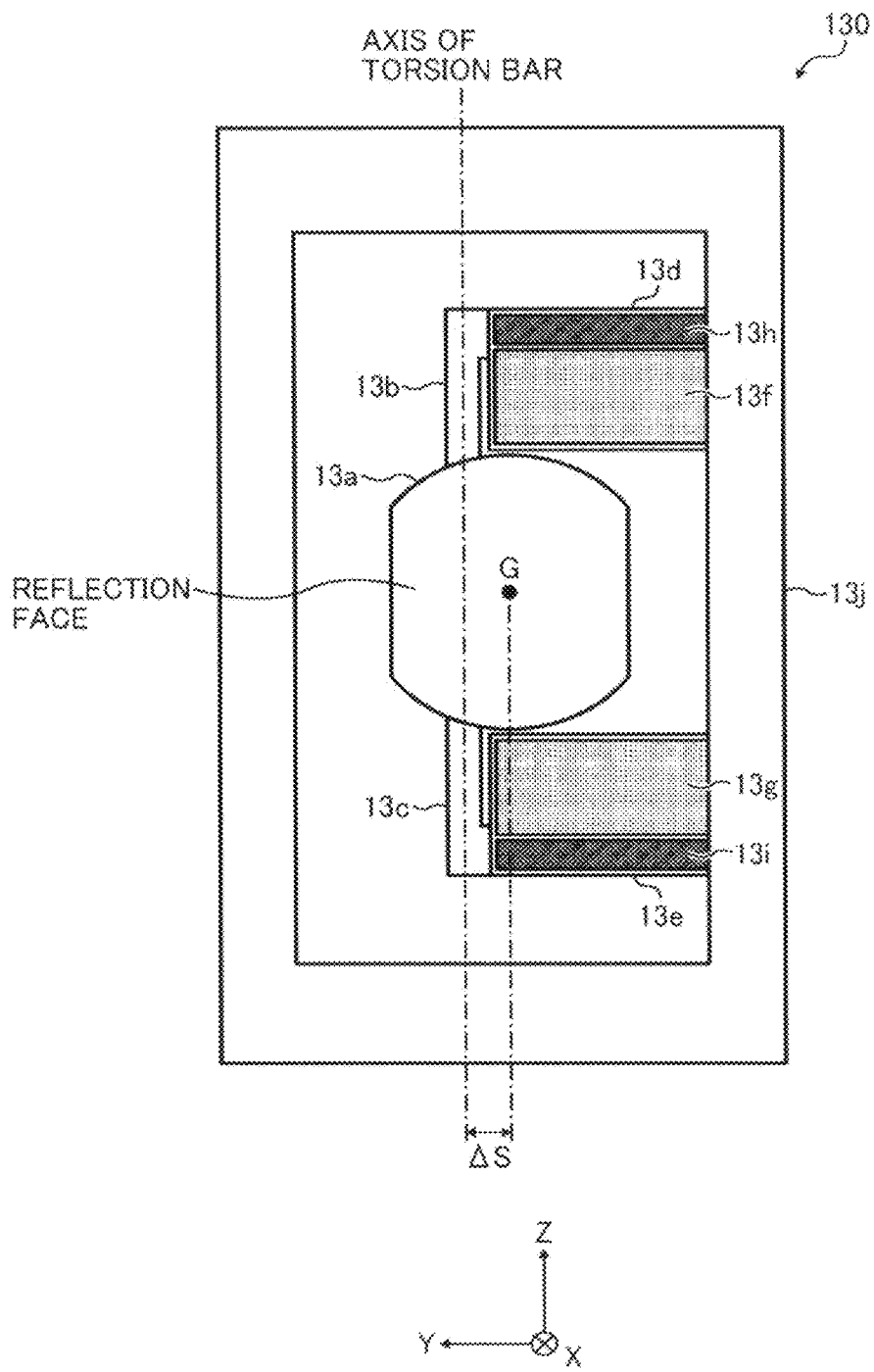
FIG. 11 is a schematic configuration of an optical deflection device of a first variant example.

In view of above attenuation issue, FIG. 11 shows an optical deflection device 130 as a first variant example, in which the detection-use piezoelectric element is constructed at a position close to a continuously-connected portion of the cantilever and the torsion bar on −X side face of the cantilever, and the drive-use piezoelectric element is constructed at a position far from the continuously-connected portion of the cantilever and the torsion bar on −X side face of the cantilever. In this configuration shown in FIG. 11, even if the size of the detection-use piezoelectric element is reduced, the detection-use piezoelectric element can receive an effect of twist resonance of the torsion bar greatly, with which a greater detection signal can be obtained. Further, because the size of the drive-use piezoelectric element can be set greater, amplitude of the deflection mirror can be set greater.

Figure 12:
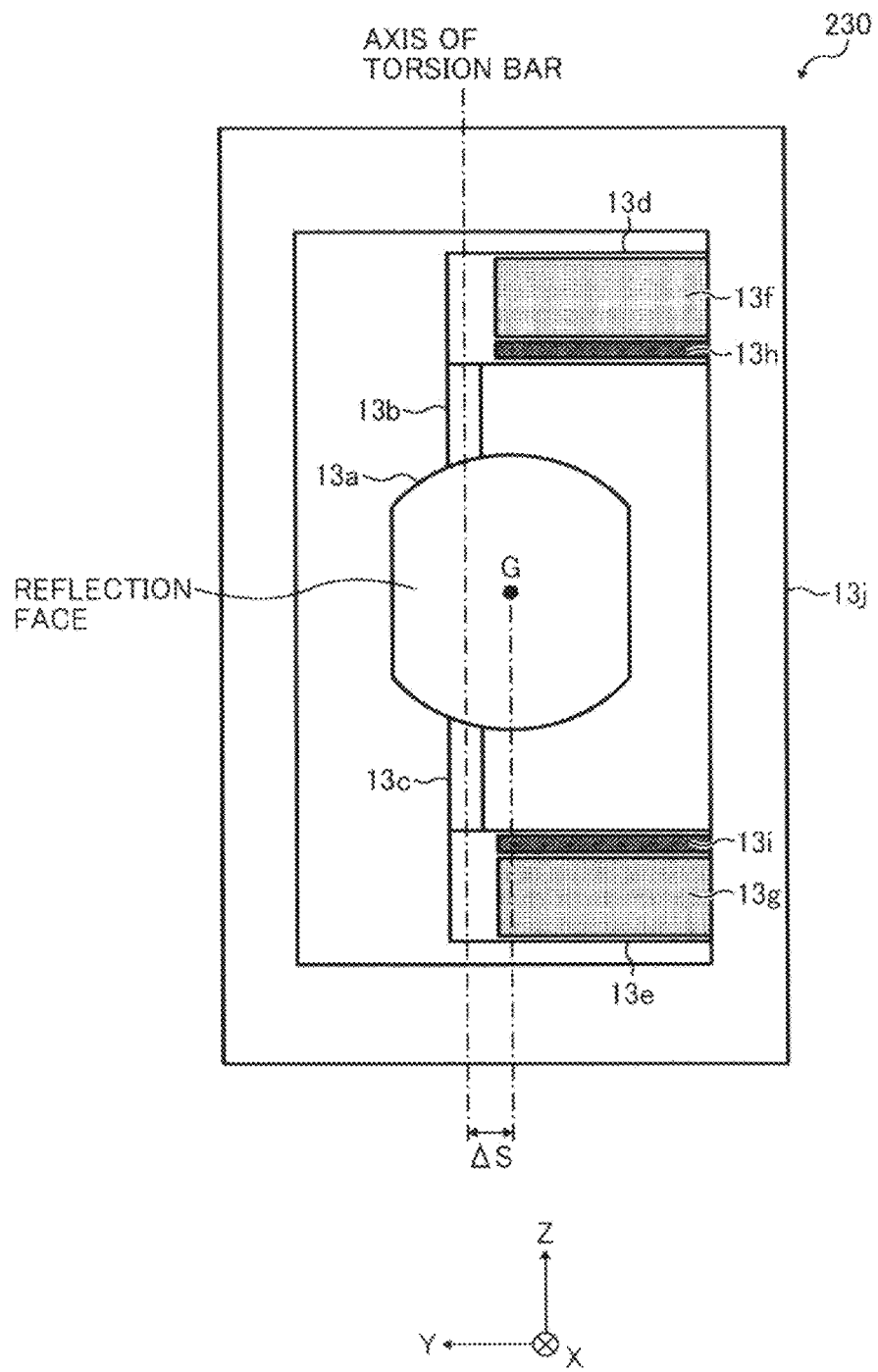
FIG. 12 is a schematic configuration of an optical deflection device of a second variant example.

Further, FIG. 12 shows an optical deflection device 230 as a second variant example, in which −Z side end face of the cantilever 13d at +Z side is constructed to +Z side end face of the torsion bar 13b disposed at +Z side, and +Z side end face of the cantilever 13e at −Z side is constructed to −Z side end of the torsion bar 13c disposed at −Z side. In this case, the cantilever 13d disposed at +Z side is positioned at +Z side of the torsion bar 13b disposed at +Z side with the right angle with respect to the torsion bar 13b, and the cantilever 13e disposed at −Z side is positioned at −Z side of the torsion bar 13c disposed at −Z side with the right angle with respect to the torsion bar 13c.

Further, the detection-use piezoelectric element is constructed at a position close to the continuously-connected portion of the cantilever and the torsion bar on −X side face of the cantilever, and the drive-use piezoelectric element is constructed at a position far from to the continuously-connected portion of the cantilever and the torsion bar on −X side face of the cantilever. In this second variant example, a greater detection signal can be obtained same as the first variant example.

A description is given of other example embodiments. In the following other example embodiments, a description is given of points different from the first example embodiment, and the same or similar configuration and function of the first example embodiment are attached with the same references, and the description of the same or similar configuration and function is omitted.

(Second Example Embodiment)

A configuration of an optical deflection device and a deflection control unit of a second example embodiment is different from the first example embodiment.

Figure 13:
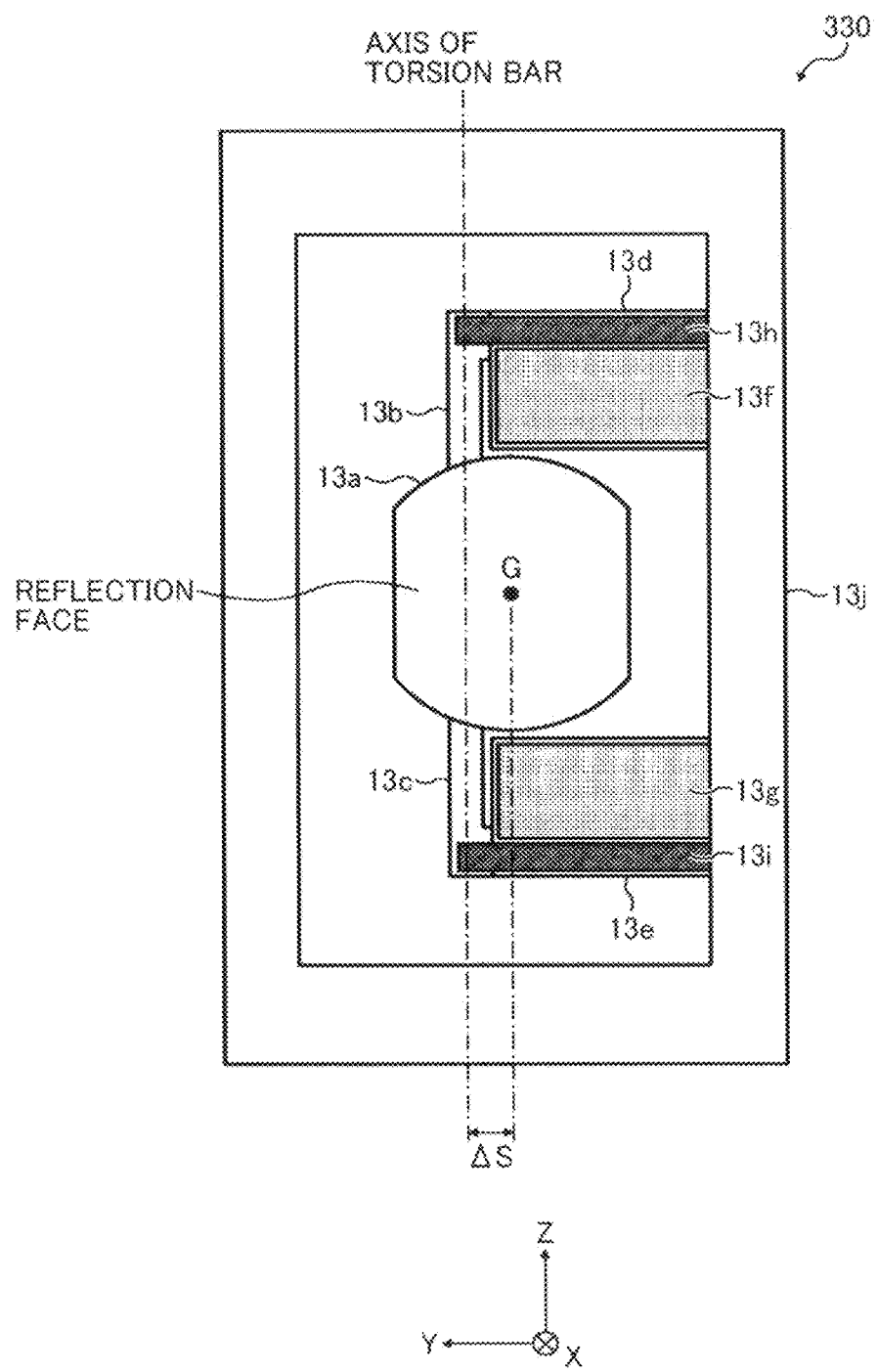
FIG. 13 is a schematic configuration of an optical deflection device of a second example embodiment.

FIG. 13 shows an optical deflection device 330 of the second example embodiment. As illustrated in FIG. 13, the detection-use piezoelectric element is constructed at a position close to the continuously-connected portion of the cantilever and the torsion bar on −X side face of the cantilever, and the drive-use piezoelectric element is constructed at a position far from the continuously-connected portion of the cantilever and the torsion bar on −X side face of the cantilever. Further, +Y side end of the detection-use piezoelectric element is positioned on the axis line of the torsion bar, which means the detection-use piezoelectric element is disposed for the corresponding cantilever while crossing a given plane parallel to a reflection face of the deflection mirror 13a and including the axis line of the torsion bar. In this configuration, the detection-use piezoelectric element can receive an effect of twist resonance of the torsion bar greatly, with which a greater detection signal can be obtained.

Figure 14:
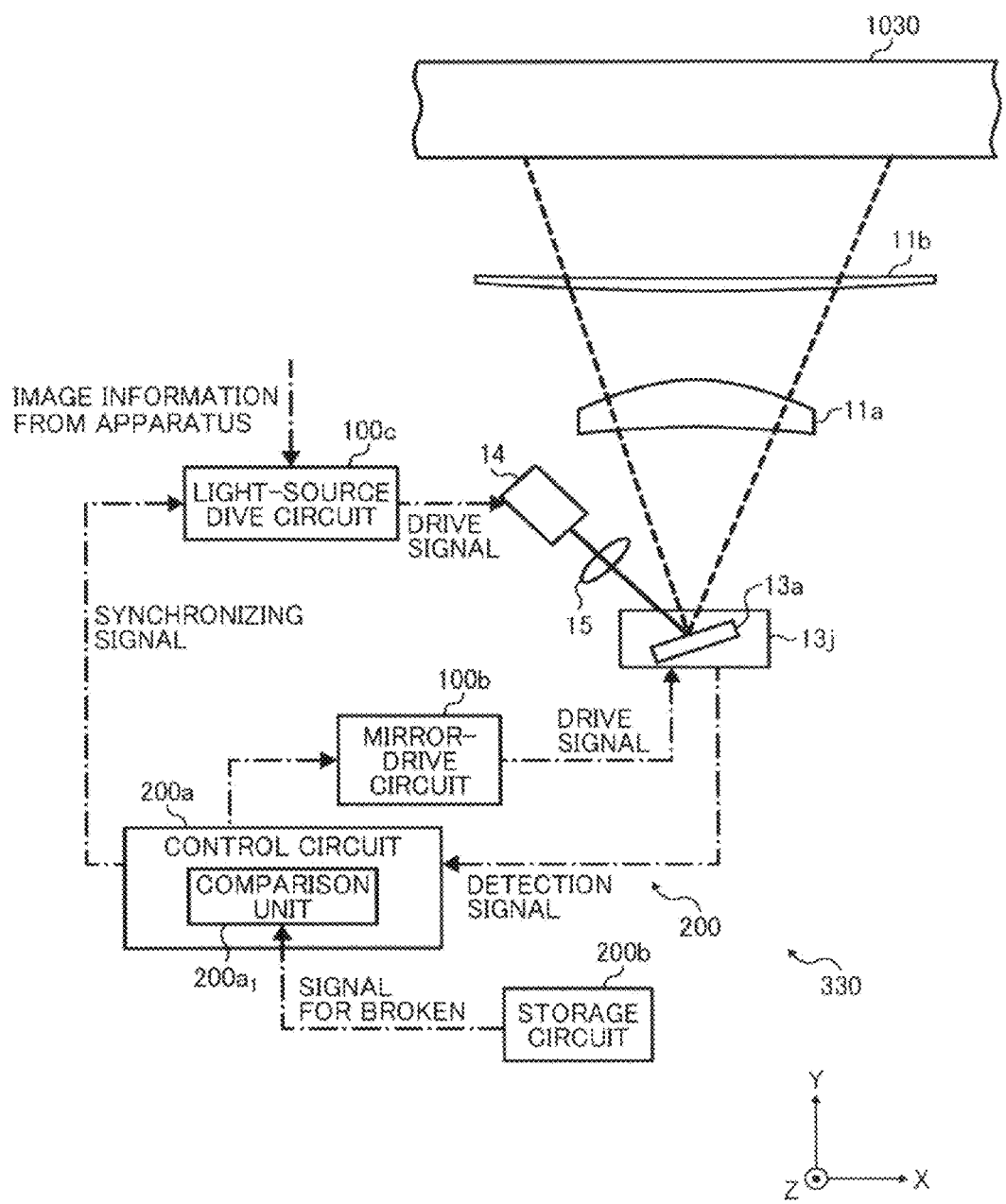
FIG. 14 is a schematic configuration of an optical scanning apparatus of the second example embodiment.

As to the second example embodiment, as illustrated in FIG. 14, a deflection control unit 200 includes, for example, a control circuit 200a having a comparison unit 200a1, the mirror-drive circuit 100b, the light-source dive circuit 100c, and a storage circuit 200b.

Figure 15A:
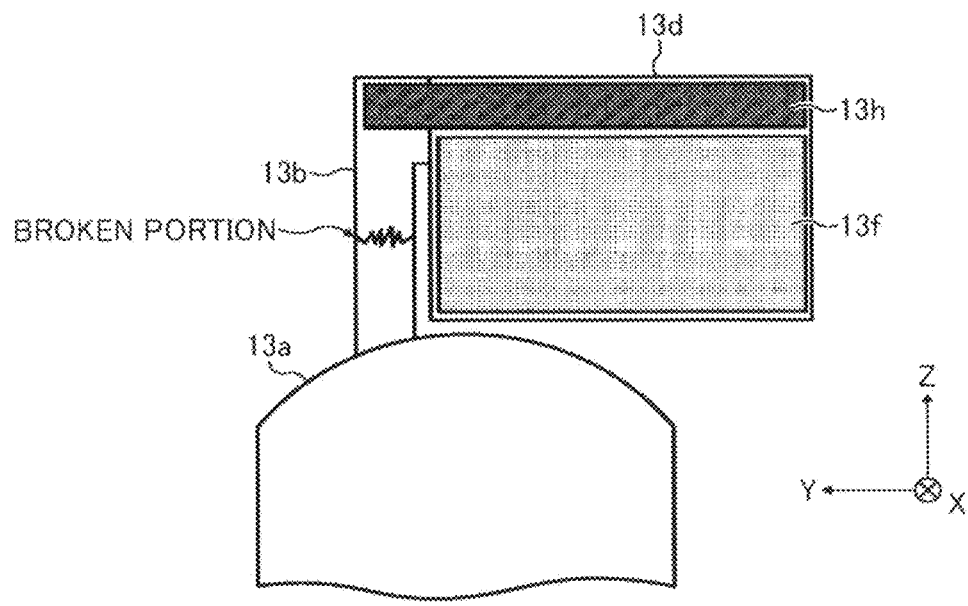
FIGS. 15A and 15B illustrate examples of broken torsion bars of the optical scanning device of the second example embodiment.
Figure 15B:
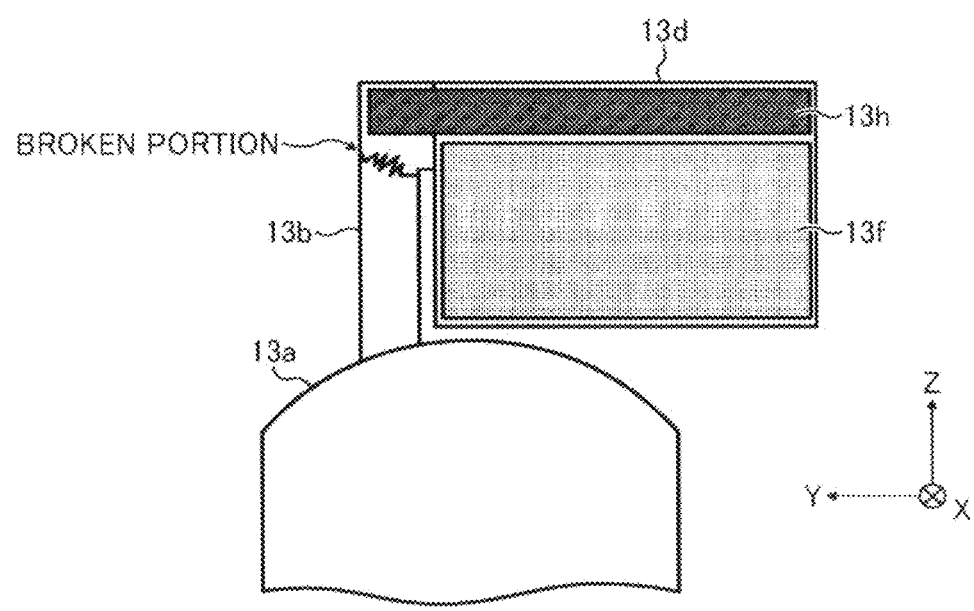

As to the optical deflection device, if a greater stress occurs to the torsion bar or a deflection operation is continued for long time, the torsion bar made of silicon may break. FIGS. 15A and 15B illustrate examples of broken torsion bars. Even if the torsion bar is broken at portions shown in FIGS. 15A and 15B, because the drive-use piezoelectric element and the detection-use piezoelectric element are constructed to the cantilever, a detection signal may be output.

For example, as to image forming apparatuses and projectors, for example, if laser beam is being emitted under a condition that the optical deflection device malfunctions due to the break of torsion bar, the laser beam is not deflected but focused on one point, which is a dangerous situation. Therefore, to secure user safety, if the torsion bar is broken, the laser output needs to be stopped. As to image forming apparatuses and projectors used as image output system, resonance frequency is higher and greater amplitude is required, with which probability of breaking of torsion bar may be expected to be higher.

Even if the torsion bar is broken, because the drive-use piezoelectric element and the detection-use piezoelectric element may be operated, a detection signal may be output. When the torsion bar is broken, reaction moment from the deflection mirror to the cantilever becomes almost zero, in which a mode changes from a normal condition when the torsion bar is not broken, and an amplitude of detection signal from the detection-use piezoelectric element becomes too small.

Figure 16:
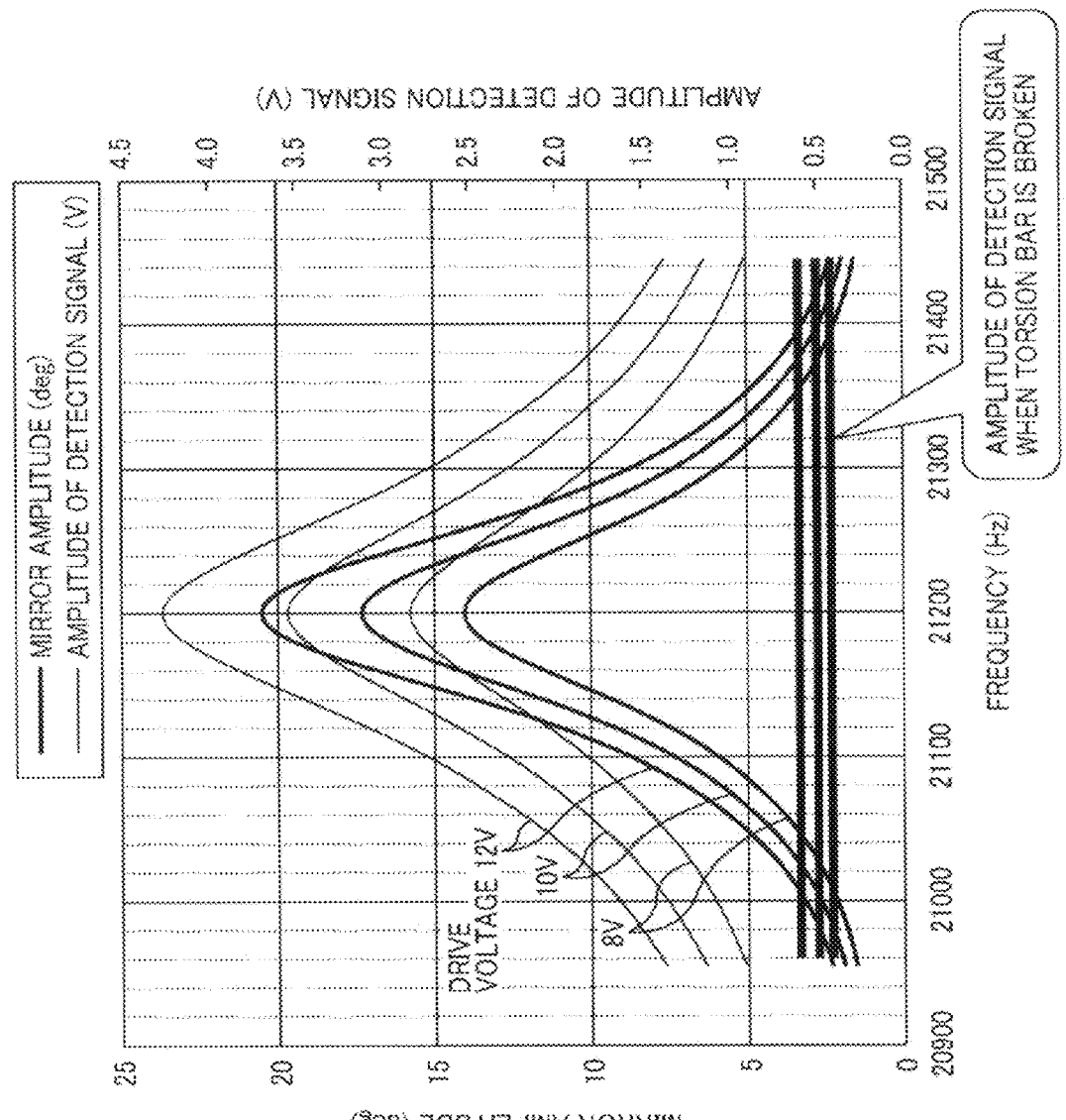
FIG. 16 is a graph showing detection signal amplitude when a torsion bar is broken on the graph of FIG. 9.

FIG. 16 shows a profile of detection signal from the detection-use piezoelectric element when the torsion bar is not broken (see a solid thin line), and a profile of detection signal from the detection-use piezoelectric element when the torsion bar is broken (see a bold line at the bottom of FIG. 16). When the torsion bar is not broken, drive voltage amplitude, mirror amplitude, and detection signal amplitude near resonance frequency maintain a given relationship (see a solid bold line in FIG. 16). By contrast, when the torsion bar is broken, this relationship is not maintained (see a bold line in FIG. 16).

As to the deflection control unit 200 of the second example embodiment, amplitude of detection signal when the torsion bar is broken can be stored in the storage circuit 200b as a voltage level for broken condition. The comparison unit 200a1 compares an amplitude of a detection signal output from each of the detection-use piezoelectric elements and the stored voltage level for broken condition. When the amplitude of detection signal becomes the voltage level for broken condition, an output of synchronizing signal from the control circuit 200a is stopped, with which driving of the light source 14 is stopped.

With this configuration, laser beam emission from the light source 14 under a condition that the torsion bar is broken can be prevented, with which user safety can be secured.

Further, as to the optical deflection device 330 of the second example embodiment, +Y side end of the detection-use piezoelectric element is positioned on the axis line of the torsion bar, which means the detection-use piezoelectric element is disposed for the corresponding cantilever while crossing a given face parallel to a reflection face of the deflection mirror 13a and including the axis line of the torsion bar. A description is given of two variant examples having this configuration.

Figure 17:
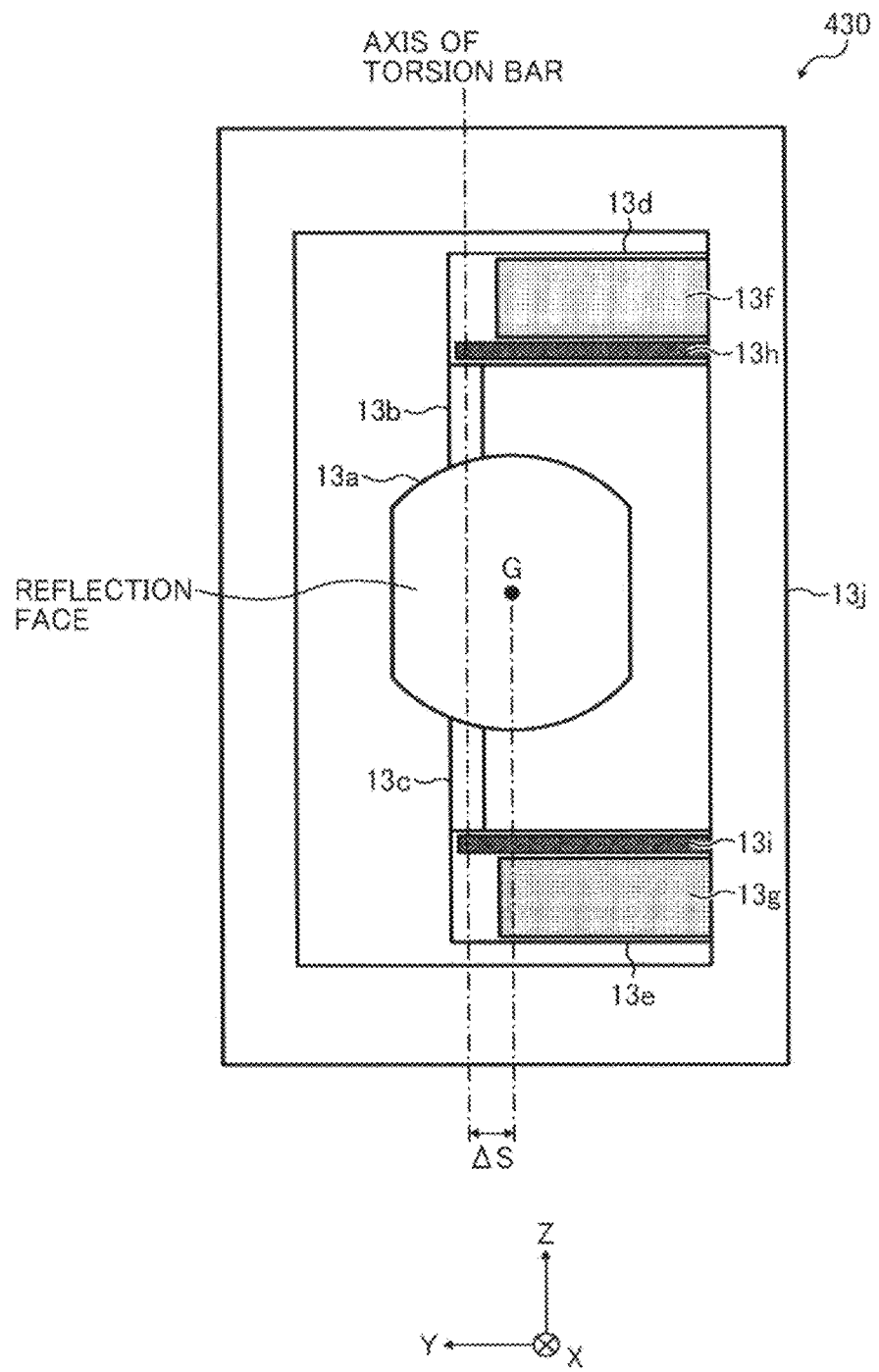
FIG. 17 is an optical deflection device of a third variant example.

FIG. 17 shows an optical deflection device 430 as a third variant example, in which −Z side end face of the cantilever 13d disposed at +Z side is being continuously connected to +Z side end face of the torsion bar 13b disposed at +Z side, and +Z side end face of the cantilever 13e disposed at −Z side is being continuously connected to −Z side end face of the torsion bar 13c disposed at −Z side. Further, the detection-use piezoelectric element is constructed at a position close to the continuously-connected portion of the cantilever and the torsion bar on −X side face of the cantilever, and +Y side end of the detection-use piezoelectric element is positioned on the axis line of the torsion bar. In this configuration too, the detection-use piezoelectric element can receive an effect of twist resonance of the torsion bar greatly, with which a greater detection signal can be obtained.

Figure 18:
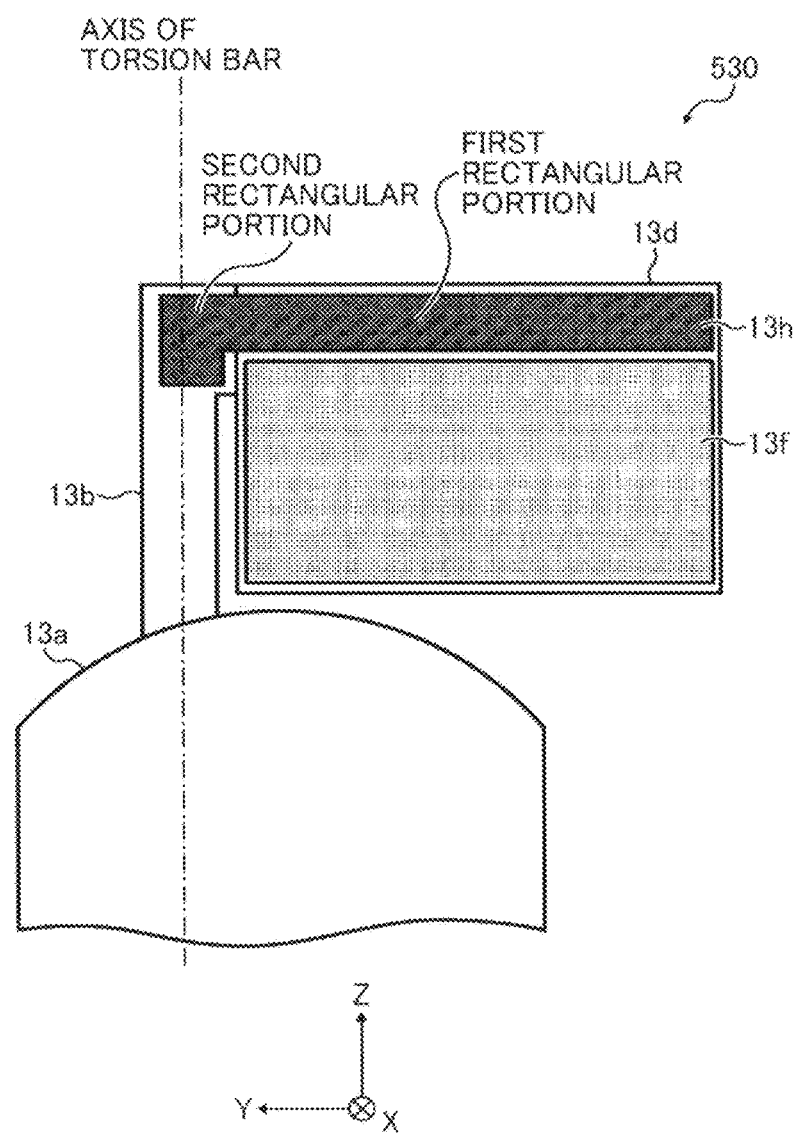
FIG. 18 is an optical deflection device of a fourth variant example.

FIG. 18 shows an optical deflection device 530 as a fourth variant example, in which the detection-use piezoelectric element is shaped as "L-form" when viewed from −X side. Specifically, the detection-use piezoelectric element includes, for example, a first rectangular portion having a long side direction in Y-axis direction, and a second rectangular portion having a long side direction in Z-axis direction while forming the right angle with respect to the first rectangular portion. The size of Z-axis direction of the second rectangular portion is set greater than the size of Z-axis direction of the first rectangular portion. Further, the second rectangular portion is positioned on the axis line of the torsion bar. Therefore, as to the fourth variant example, a greater area can be set for the drive-use piezoelectric element as much as possible, and a greater signal can be obtained from the detection-use piezoelectric element.

If the resonance frequency changes greatly due to environmental temperature, a detection signal output from the detection-use piezoelectric element when the torsion bar is broken (hereinafter, detection signal when broken) and a detection signal output from the detection-use piezoelectric element when the torsion bar is not broken (hereinafter, normal detection signal) may not be distinguished. As indicated in FIG. 16, the amplitude of the detection signal when the torsion bar is broken and the amplitude of the normal detection signal has little difference at the skirts of resonance peak. In this case, breaking of the torsion bar cannot be detected.

Figure 19:
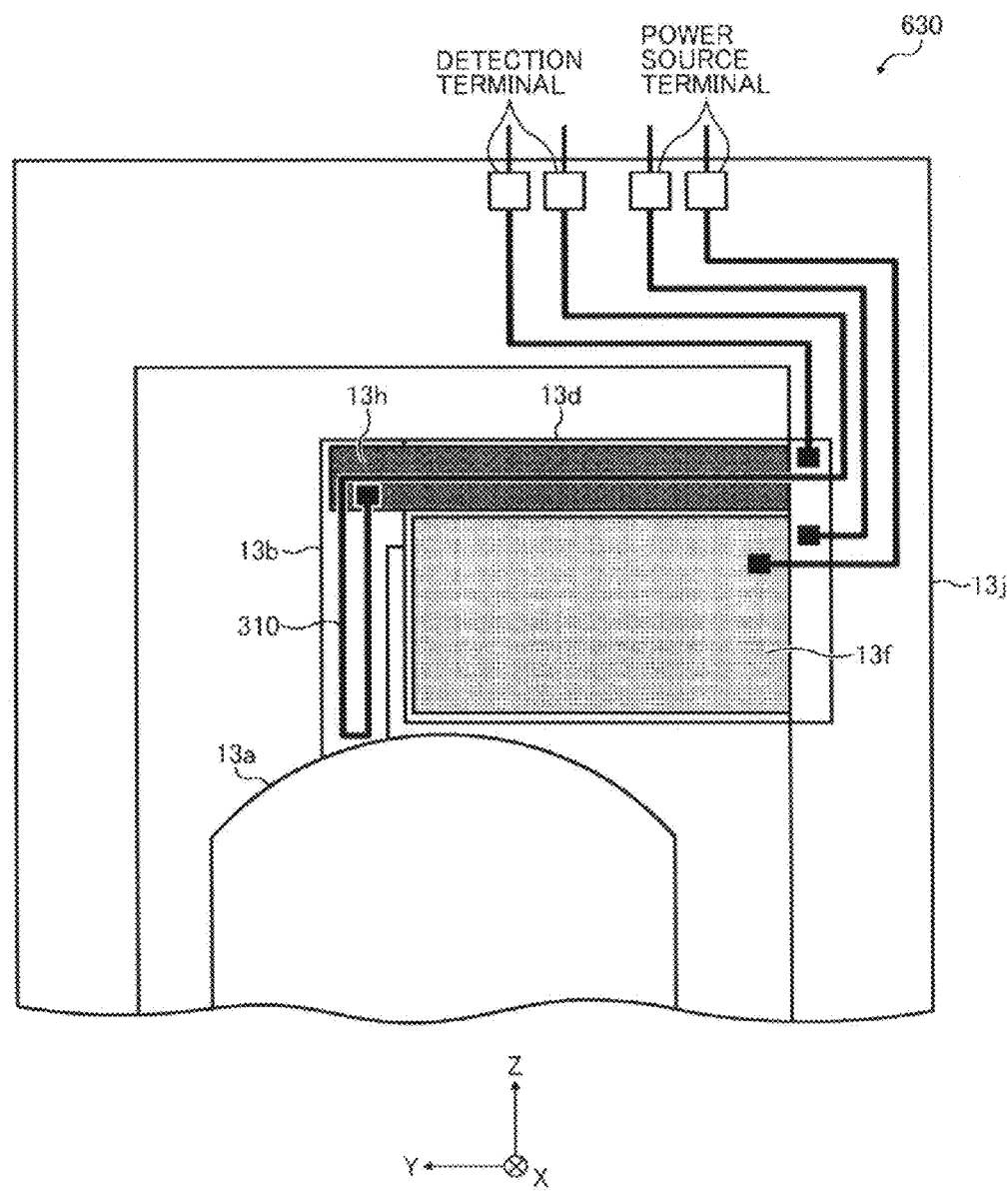
FIG. 19 is an optical deflection device of a fifth variant example.

In view of this situation, an optical deflection device 630 shown in FIG. 19 is devised. FIG. 19 shows the optical deflection device 630 as a fifth variant example, in which wiring 310 (e.g., aluminum) for connecting the detection-use piezoelectric element and the detection terminal is also wired along the torsion bar, in which when the torsion bar is broken, the wiring is also broken.

As illustrated in FIG. 19, the wiring 310 includes, for example, a straight line portion and a U-shaped portion. The straight line portion extends along Y-axis direction of the detection-use piezoelectric element 13h, and the U-shaped portion has one end being connected to +Y side end of the straight line portion while extending along Z-axis direction of the torsion bar 13b. Further, another end of the U-shaped portion is connected to the detection-use piezoelectric element 13h. In FIG. 19, a pair of electrodes for sandwiching each piezoelectric element is not shown for the simplicity of the drawing.

In this configuration, when the torsion bar is broken, the wiring 310 is also broken, with which the detection signal is not output from the detection-use piezoelectric element 13h, and the synchronizing signal is not output from the control circuit 200a to the light source 14, and then driving of the light source 14 can be stopped.

As above described, if the piezoelectric element is disposed on the torsion bar, attenuation of the torsion bar becomes greater, and mirror amplitude becomes smaller. However, the wiring 310 such as aluminum has a thickness of, for example, about 1/10 of the piezoelectric element, and further, the width of the wiring 310 can be set at a minimum level required for supplying electricity, with which breaking of the torsion bar can be detected without decreasing the mirror amplitude.

(Third Example Embodiment)

Figure 20:
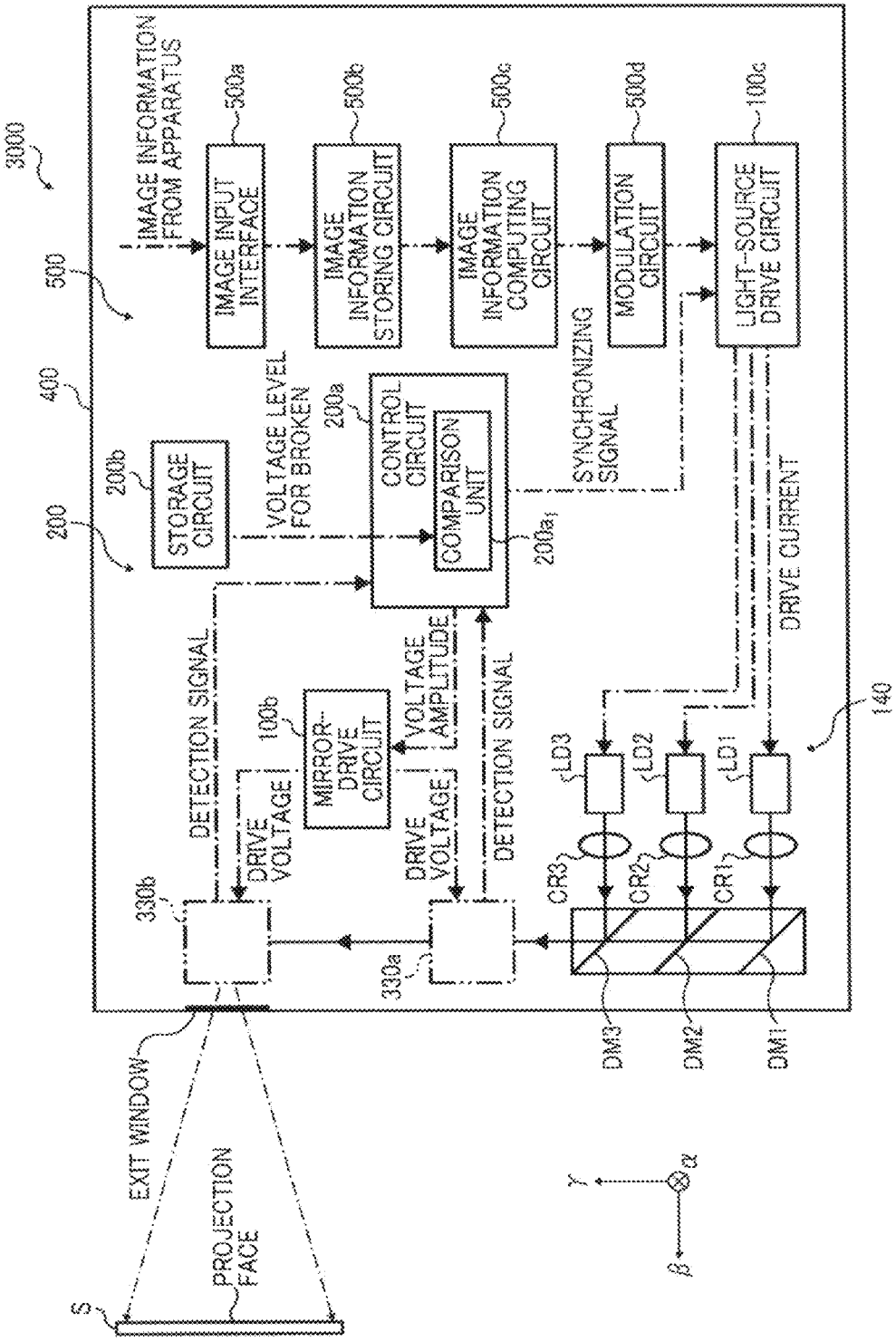
FIG. 20 is a schematic configuration of a projector of a third example embodiment.

A description is given of a projector 3000, used as an image forming apparatus, as a third example embodiment with reference to FIG. 20.

As illustrated in FIG. 20, the projector 3000 includes, for example, a light source device 140, first and second optical deflection devices 330a and 330b, a main control unit 500, and a housing 400 to encase these units. Each of first and second optical deflection devices 330A and 330b are substantially same as the optical deflection device 330 of the second example embodiment. A description is given using αβγ three dimensional orthogonal coordinate system shown in FIG. 20.

The light source device 140 includes, for example three laser diodes LD1 to LD3, three collimate lenses CR1 to CR3, and three dichroic mirrors DM1, DM2, DM3.

The laser diode LD1 is, for example, red laser, and is disposed at a position to emit red light (wavelength of 640 nm) to +β direction.

The laser diode LD2 is, for example, blue laser, and is disposed at +γ side of the laser diode LD1 to emit blue light (wavelength of 450 nm) to +β direction.

The laser diode LD3 is, for example, green laser, and is disposed at +γ side of the laser diode LD2 to emit green light (wavelength of 520 nm) to +β direction.

The collimate lens CR1 is, for example, is disposed at +β side of the laser diode LD1 to set red light emitted from the laser diode LD1 to substantially parallel light.

The collimate lens CR2 is, for example, is disposed at +β side of the laser diode LD2 to set blue light emitted from the laser diode LD2 to substantially parallel light.

The collimate lens CR3 is, for example, is disposed at +β side of the laser diode LD3 to set green light emitted from the laser diode LD3 to substantially parallel light.

The dichroic mirror DM1 is, for example, disposed at +β side of the collimate lens CR1 while slanted, for example, 45 degrees with respect to β axis and γ axis to reflect red light from the collimate lens CR1 to +γ direction.

The dichroic mirror DM2 is, for example, disposed at +γ side of the dichroic mirror DM1 and at +β side of the collimate lens CR2 while slanted, for example, 45 degrees with respect to β axis and γ axis to pass through red light from the dichroic mirror DM1 to +γ direction, and to reflect blue light from the collimate lens CR2 to +γ direction.

The dichroic mirror DM3 is, for example, disposed at +γ side of the dichroic mirror DM2 and at +β side of the collimate lens CR3 while slanted, for example, 45 degrees with respect to β axis and γ axis to pass through red light and blue light from the dichroic mirror DM2 to +γ direction, and to reflect green light from the collimate lens CR3 to +γ direction.

Three lights (red light, blue light and green light) passing the dichroic mirror DM3 are synthesized as one light, in which the color of synthesized light can be generated based on balance of emission light intensity of the three laser diodes LD1 to LD3.

Further, instead of the dichroic mirror DM3, a synchronization prism can be used, in which red light and blue light from the dichroic mirror DM2 and green light from the collimate lens CR3 is synthesized, and the synthesized light is emitted to +γ direction.

With this configuration, the light source device 140 emits a laser beam (synthesized light) synthesizing three laser beams from the three laser diodes LD1 to LD3 to +γ direction.

The first and second optical deflection devices 330A and 330b are used to scan a projection face of the screen S two-dimensionally in the main scanning direction (α-axis direction) and the sub-scanning direction (γ-axis direction) using laser beams. As to the third example embodiment, the two optical deflection devices 330A and 330b are combined to scan the screen S two-dimensionally.

The first optical deflection device 330a is disposed to position the deflection mirror 13a on a light path of laser beam from the light source device 140, and to set the axis line of the torsion bar parallel to a axis. With this configuration, the laser beam from the light source device 140 is deflected to a direction corresponding to the sub-scanning direction by the first optical deflection device 330a.

The second optical deflection device 330b is disposed to position the deflection mirror 13a on a light path of laser beam deflected by the first optical deflection device 330a, and to set the axis line of the torsion bar parallel to γ axis. With this configuration, the laser beam from the first optical deflection device 330a is deflected to the main scanning direction by the second optical deflection device 330b, and projected to the screen S disposed at +β side of the housing 400 via an exit window of the housing 400.

Further, the positional relationship of the first and second optical deflection devices 330A and 330b can be switched.

The main control unit 500 includes, for example, an image input interface 500a, an image information storing circuit 500b, an image information computing circuit 500c, a modulation circuit 500d, and the deflection control unit 200.

A description is given of a control flow of the projector 3000. Image information is input from an apparatus such as a personal computer (PC) via the image input interface 500a, and the input image information is stored in the image information storing circuit 500b temporarily. Then, the image information computing circuit 500c sets emission light intensity of each laser diode (i.e., amplitude of drive signal) matched to the input image information. Then, the modulation circuit 500d modulates a drive signal of each laser diode based on the input image information, and outputs a modulated drive signal to the light-source dive circuit 100c. The light-source dive circuit 100c converts the modulated drive signal to a drive current based on the detection signal output from the first and second optical deflection devices 330A and 330b and the synchronizing signal generated by the control circuit 200a, and drives each laser diode. With this configuration, a two-dimensional full color image can be projected on the screen S.

Further, as same as the above second example embodiment, when the torsion bar is broken, the projector 3000 can stop driving of each laser diode.

Further, two optical deflection devices are used for the third example embodiment but not limited hereto. For example, one optical deflection device, and three or more deflection devices can be used, in which light can be scanned in one direction, or three or more directions.

Further, the configuration the light source device 140 of the third example embodiment can be changed. For example, the light source device 140 includes three laser diodes corresponding to three primary colors of light, but the light source device 140 can include one laser diode or four or more laser diodes, in which the number of collimate lens and dichroic mirror can be changed depending on the number of laser diodes.

Further, as to the third example embodiment, an image is formed on a surface of the screen S (i.e., scanned face) by two-dimensionally scanning laser beam using two optical deflection devices but not limited hereto. For example, a surface (i.e., scanned face) of member that can pass or reflect laser beam is two-dimensionally scanned using two optical deflection devices and laser beam, and a semi-translucent member (e.g., combiner) can be disposed on a light path of laser beam via the scanned face, in which a virtual image of an image formed on the scanned face can be viewed via the semi-translucent member. Such configuration can be used, for example, as a headup display or a head-mount display. Further, vehicles having such configured headup display can be provided. In this case, a virtual image of an image formed on the scanned face can be viewed through a windshield (i.e., glass) of a vehicle via the semi-translucent member. Further, the semi-translucent member can be a windshield of a vehicle.

(Fourth Example Embodiment)

Hereinafter, the deflection mirror 13a may be simply referred to as "mirror." As to the optical deflection device, due to manufacturing fluctuation of the support member such as fluctuation of film forming of piezoelectric element and environmental condition change such as ambient temperature change, amplitude of detection voltage (amplitude of detection signal) obtained by deformation of the piezoelectric element fluctuates a little after the activation of the mirror (after starting the operation). This fluctuation has the same pattern when activating the mirror each time. Because detection signal amplitude fluctuates even if the mirror amplitude is constant, if the drive signal of the mirror is controlled simply depending on the detection signal amplitude, the mirror amplitude fluctuates, with which constant amplitude cannot be maintained. Therefore, to maintain the mirror amplitude at a constant value for the optical deflection device, when detection signal amplitude deviates from a target value set for corresponding mirror amplitude, it is preferable to conduct a feedback operation to control detection signal amplitude. Therefore, it is preferable to correct amplitude of detection voltage, and to adjust drive voltage amplitude based on the detection signal amplitude after the correction.

Further, because phase of detection signal (detection voltage), which may be referred to as detection signal phase or detection voltage phase, also fluctuates depending on time after starting the operation, synchronization timing for activating a light source (i.e., emitting light) for the mirror operation may deviate. Therefore, it is preferable to correct the detection voltage phase, and to adjust the drive voltage phase based on the detection voltage phase after the correction.

Fluctuation of detection voltage amplitude (detection voltage phase) can be returned to an initial condition gradually after the mirror is stopped. However, if the mirror is operated (i.e., re-started) before a given time elapses after the mirror stop, fluctuation still remains, with which amplitude error and/or synchronization timing error occurs.

As to the fourth example embodiment, the deflection control unit includes, for example, an operation time measurement unit to measure operation time of the mirror, a storage unit to store timewise coefficient of fluctuation of detection voltage and time constant of detection voltage, and a control circuit, which can be used as an adjustment unit, to correct detection voltage based on the operation time, timewise coefficient of fluctuation and time constant and to adjust drive voltage based on the corrected voltage. The control circuit includes a computing unit to conduct computing using equations (1) to (4) to be described later. Further, the drive voltage adjusted by the control circuit is output to the mirror-drive circuit 100b, and the mirror-drive circuit 100b supplies the drive signal to the deflection mirror 13a.

Figure 21:
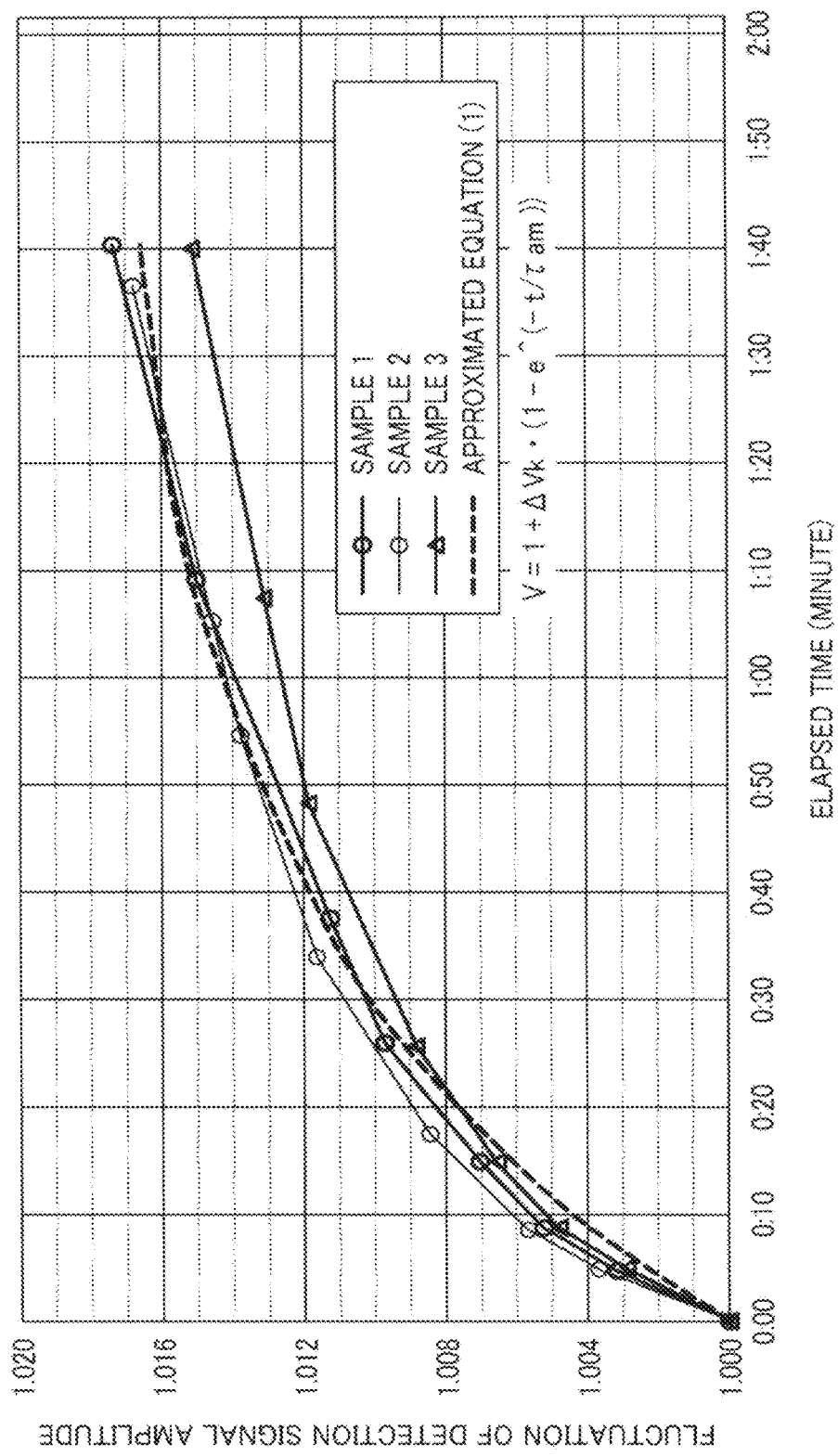
FIG. 21 is a graph showing timewise change of detection signal amplitude when a mirror is operated.

As described above, the detection signal amplitude (detection voltage amplitude) from the detection-use piezoelectric element fluctuates timewisely after starting the operation even if the mirror amplitude is maintained at a constant level due to property of the piezoelectric element (see FIG. 21). FIG. 21 is a graph showing timewise change or fluctuation of detection signal amplitude when a mirror is operated, in which the vertical axis is detection signal amplitude, and fluctuation ratio with respect to an initial output value of a given mirror amplitude (i.e., reference value) is plotted. The timewise change or fluctuation may vary depending on film forming methods of piezoelectric element. When the same film forming condition is used, similar fluctuation occurs. For example, the timewise fluctuation of detection signal amplitude shown in FIG. 21 can be expressed by following equation (1) as a function of the operation time "tm" (tm is time after starting the operation of mirror).

$$V(tm)=1+\Delta Vk[1-\exp(-tm/\tau am)] \qquad (1)$$

Further, the equation (1) and the to-be-described equations (2), (3), and (4) can be obtained based on experiments using at least one optical deflection device and approximating at least one sample data.

In the above equation (1), $\Delta Vk$ is a coefficient indicating a timewise change rate of detection signal amplitude (coefficient of fluctuation). $\tau am$ is a time constant indicating time length that the detection signal amplitude becomes constant (i.e., change of detection signal amplitude becomes zero), and this could be related to property of piezoelectric element. For example, $\Delta Vk=0.02$ (fluctuation ratio is 2%), and $\tau am=2160$ sec.

Figure 22:
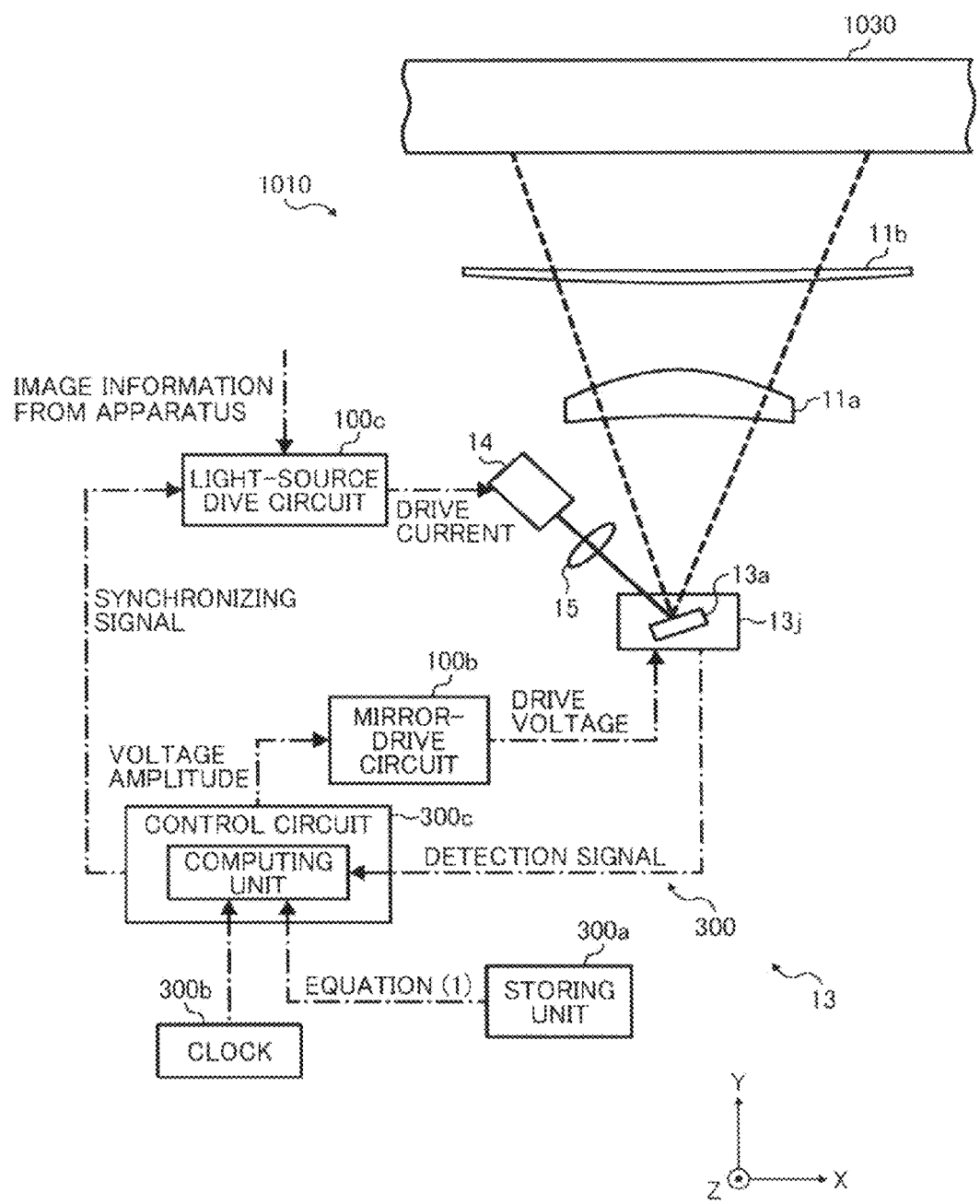
FIG. 22 is a schematic configuration of an optical scanning apparatus of example 1 of a fourth example embodiment.

As to example 1 of the fourth example embodiment shown in FIG. 22, the equation (1) is stored in a storing unit 300a. The storing unit 300a stores at least $\Delta Vk$ and $\tau am$. Further, a clock 300b, which is used as the operation time measurement unit, can measure the operation time tm, which is time after activating the mirror. An amplitude of detection signal of the detection-use piezoelectric element can be corrected by removing the fluctuation amount using the equation (1), with which corrected amplitude can be obtained. Therefore, by conducting the feedback control based on difference of a current value of detection signal amplitude and a target value of detection signal amplitude, a control maintaining the target value can be conducted by a deflection control unit 300.

Specifically, the detection signal amplitude A(tm) at a time "tm" during the mirror operation is divided by V(tm) to obtain a detection signal amplitude A'(tm) at time "tm" as a detection signal amplitude after the correction. Based on the corrected detection signal amplitude A'(tm)=A(tm)/V(tm), the drive voltage amplitude can be adjusted. The drive voltage amplitude can be adjusted, for example, based on a target value of a ratio between an amplitude of drive voltage and an amplitude of detection voltage, and the corrected detection signal amplitude A'(tm). Further, the correction equation is not limited to the equation (1), but other equation corresponding to the piezoelectric element property and required precision can be used for correction.

Figure 23:
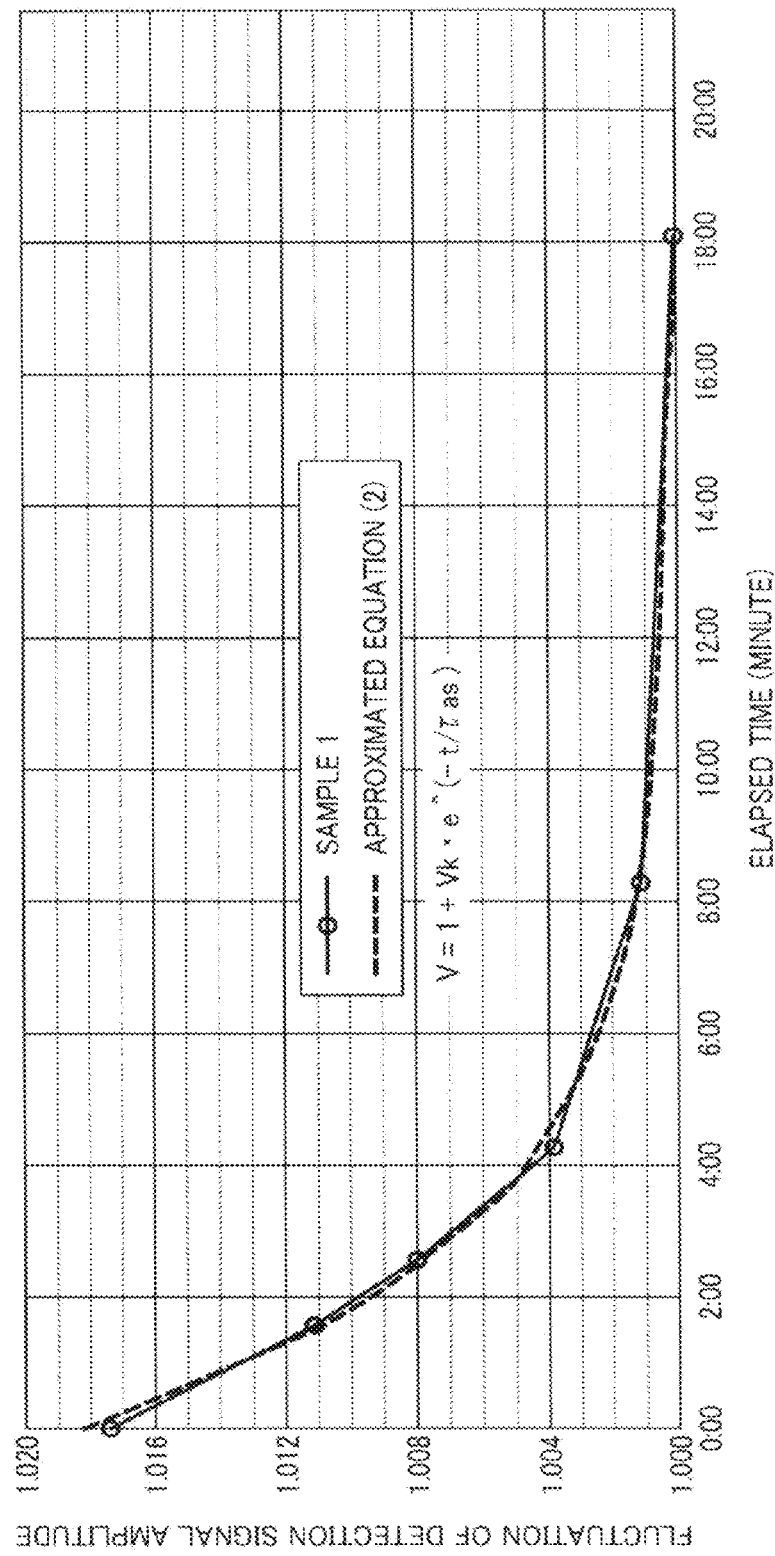
FIG. 23 is a graph showing timewise change of detection signal amplitude when a mirror is stopped.

Further, as described above, timewise change of detection signal from the detection-use piezoelectric element can be returned to an initial value. Specifically, after starting the operation of the mirror, detection signals fluctuate as illustrated in FIG. 21, but detection signals can return to an initial output value (i.e., initial value) after the mirror is stopped depending on stop time length as illustrated in FIG. 23. In this configuration, if the mirror is activated (i.e., mirror operation is resumed) after starting the stop of mirror under a condition that a given time (i.e., time to return to initial value) has not yet elapsed, the correction conducted by the example 1 may cause error to the detection signal amplitude.

Figure 24:
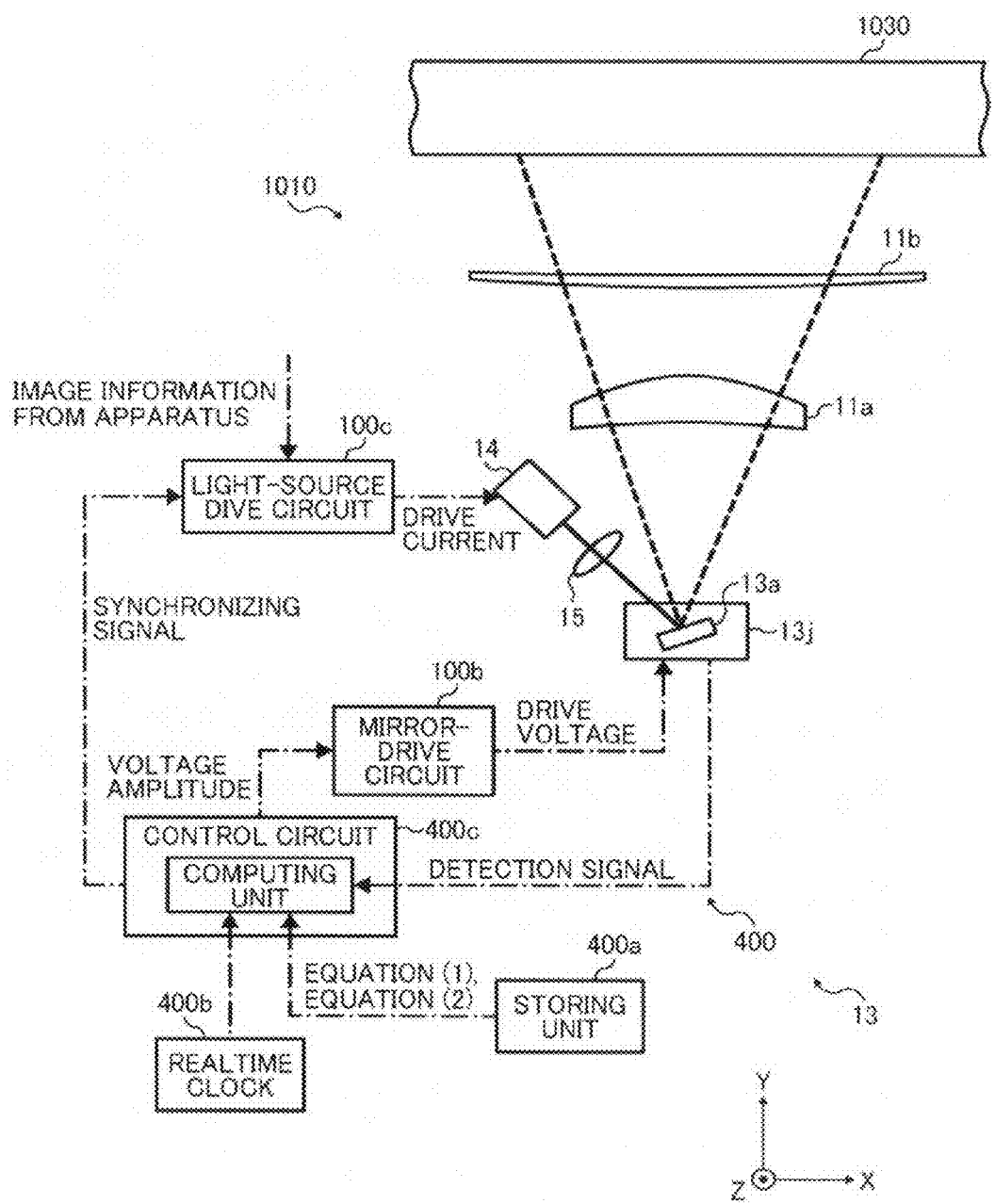
FIG. 24 is a schematic configuration of an optical scanning apparatus of example 2 of the fourth example embodiment.

In view of this situation, as to example 2 of the fourth example embodiment shown in FIG. 24, a deflection control unit 400 includes a real time clock 400b to measure time when a mirror is being stopped (i.e., when power is maintained OFF) instead of the clock 300b used for the example 1.

The timewise fluctuation of detection signal amplitude shown in FIG. 23 can be expressed by equation (2) by using stop-time length "ts," which is time length from a stop-start of mirror to a stop-end of mirror.

$$V(ts)=1+\Delta Vk\times\exp(-ts/\tau as) \qquad (2)$$

In the above equation (2), $\Delta Vk$ is same as the above example 1. $\tau as$ is a time constant indicating time length that the detection signal amplitude returns to a given value such as an initial value after the mirror is stopped, and this could be related to property of piezoelectric element. For example, $\tau as=10000$.

As to the example 2 of the fourth example embodiment, the above equations (1) and (2) are stored in a storage unit 400a. The storage unit 400a stores at least $\Delta Vk$, $\tau am$, and $\tau as$. Further, because the real time clock 400b can record time information during the mirror operation and during the mirror-stop, the mirror stop-time length can be obtained based on the mirror stop-start time (i.e., operation end time) and the stop-end time (i.e., next operation start time). Therefore, by conducting correction of detection signal amplitude using the equations (1) and (2) when the mirror operation is resumed after the stop of mirror, an amplitude control maintaining a correct target value can be conducted by a deflection control unit 400.

Specifically, the corrected detection signal amplitude A'(tme)=A(tme)/V(tme) at the mirror operation end time "tme" (i.e., stop-start time) is divided by V(ts) to obtain detection signal amplitude A(ts)=A'(tme)/V(ts) at one time "ts" during the mirror-stop. Based on the detection signal amplitude A(tse)=A'(tme)/V(tse) at the mirror stop end time "tse" (i.e., next operation start time) and the equation (1), that is $\Delta Vk$ and $\tau am$, a detection signal amplitude after resuming the operation can be corrected.

More specifically, A(tse), which is a remaining portion of detection signal amplitude, is added to the detection signal amplitude A (tm) after resuming the mirror operation, and then divided by V(tm), with which a corrected detection signal amplitude A'(tm)=[A(tm)+A(tse)]/V(tm) after resuming the mirror operation can be obtained. In this configuration, by adding the remaining amplitude portion of the mirror stop time, the corrected detection signal amplitude A'(tm) after resuming the operation can be obtained without error. Further, "tm" is reset to zero after resuming the mirror operation. Further, the correction equation is not limited to the equation (2), but other equation corresponding to the piezoelectric element property and required precision can be used for correction.

As described above, when an image is formed using the optical deflection device, light emission timing of a light source (e.g., laser diode) is required to be synchronized to the scan timing (i.e., image output). If the correct synchronization is not established, scanning positions or pixel positions deviate in reciprocal scanning, which may result into abnormal image such as double image. As to the optical deflection device using the piezoelectric element, it is known that phase of detection signal from the detection-use piezoelectric element fluctuates timewisely after the operation.

Figure 25:
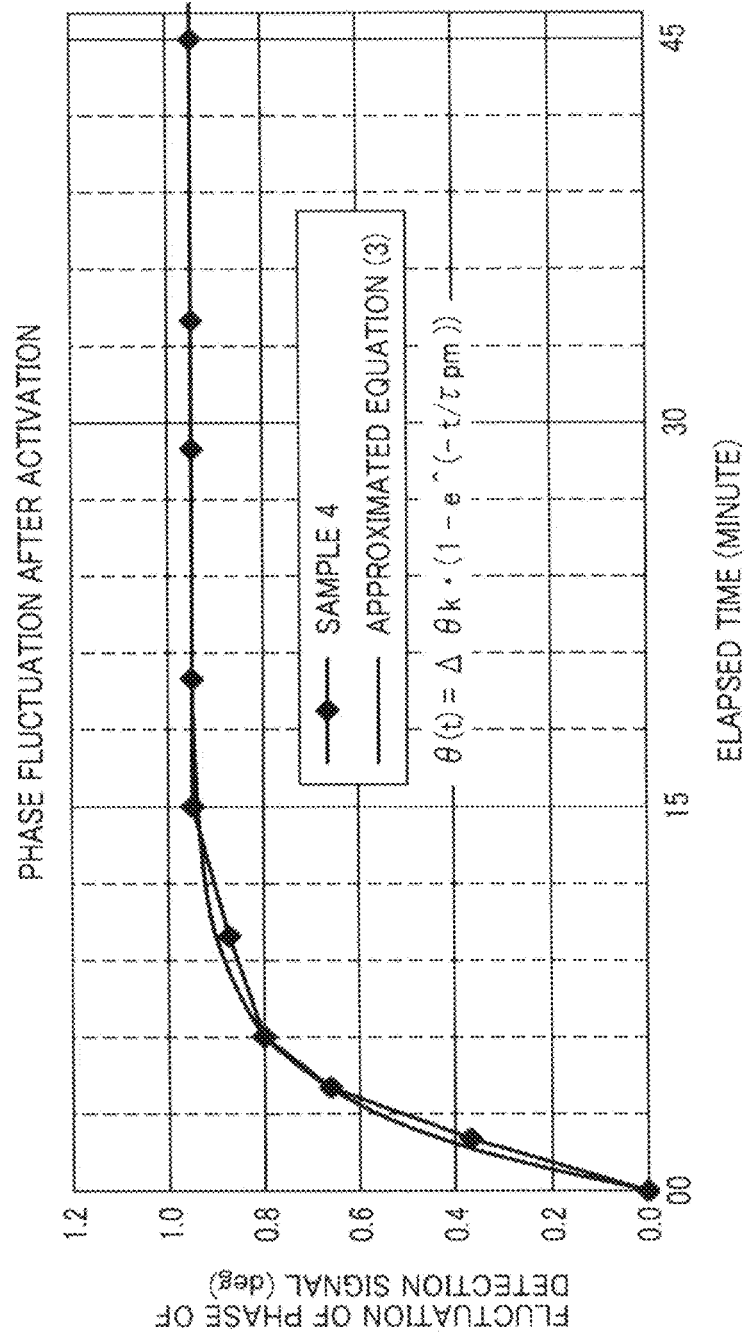
FIG. 25 is a graph showing timewise change of detection signal phase when a mirror is operated.

FIG. 25 is a graph of fluctuation of phase of detection signal (hereinafter, detection signal phase), in which the vertical axis indicates fluctuation of the detection signal phase. The fluctuation of detection signal phase may vary depending on film forming methods of piezoelectric element. When the same film forming condition is used, similar fluctuation occurs. For example, the timewise fluctuation of detection signal phase can be expressed by following equation (3) as a function of the operation time "tm."

$$\theta(tm) = \Delta\theta k[1-\exp(-tm/\tau pm)] \quad (3)$$

In the above equation (3), $\Delta\theta k$ is a coefficient indicating change rate of phase (coefficient of fluctuation), and $\tau pm$ is a time constant indicating time length that the detection signal phase returns to a given value such as an initial phase after the mirror is stopped, and this could be related to property of piezoelectric element. For example, $\Delta\theta k=0.95$ deg, and $\tau pm=200$.

Figure 26:
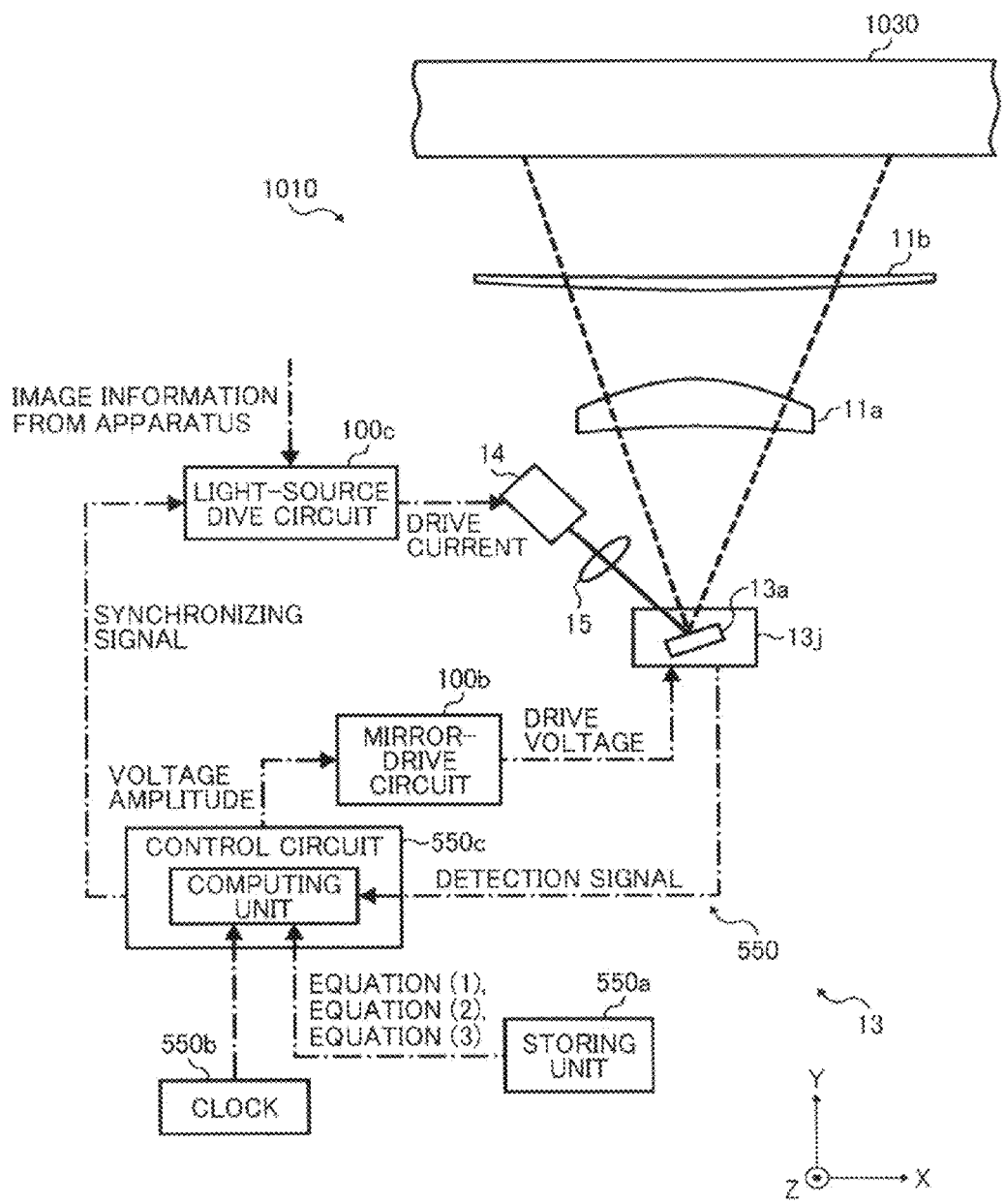
FIG. 26 is a schematic configuration of an optical scanning apparatus of example 3 of the fourth example embodiment.

As to example 3 of the fourth example embodiment shown in FIG. 26, a storage unit 550a and a clock 550b are provided. The above equations (1), (2) and (3) are stored in the storage unit 550a. The storage unit 550a stores at least $\Delta Vk$, $\tau am$, $\tau as$, $\Delta\theta k$, and $\tau pm$. The clock 550b measures the operation time of the mirror. In this configuration, detection signal phase is corrected by removing fluctuation amount using the above equation (3), with which correct phase difference of the drive voltage and the detection voltage can be obtained. In this configuration, an image can be output (i.e., image light for scanning) by synchronizing to the corrected phase, with which the image can be formed with higher precision.

Specifically, by dividing a detection signal phase C (tm) at one time "tm" during the mirror operation by $\theta(tm)$, a corrected detection signal phase C'(tm) at the time "tm" can be obtained. Based on the corrected detection signal phase $C'(tm)=C(tm)/\theta(tm)$, a drive voltage phase can be adjusted by a deflection control unit 550. For example, the drive voltage phase can be adjusted based on a target value for phase difference between the drive voltage and the detection voltage, and the corrected detection signal phase C'(tm). Further, the correction equation is not limited to the equation (3), but other equation corresponding to the piezoelectric element property and required precision can be used for correction.

As to the example 3, the storage unit 550a stores the above equations (1), (2) and (3), with which in addition to an adjustment of the drive voltage phase based on the detection signal phase, an adjustment of the drive voltage amplitude based on the detection signal amplitude can be conducted.

Further, as to the example 3, the above equations (1), (2) and (3) are stored, but at least one of the above equations (1) and (2) is not required to be stored.

Figure 27:
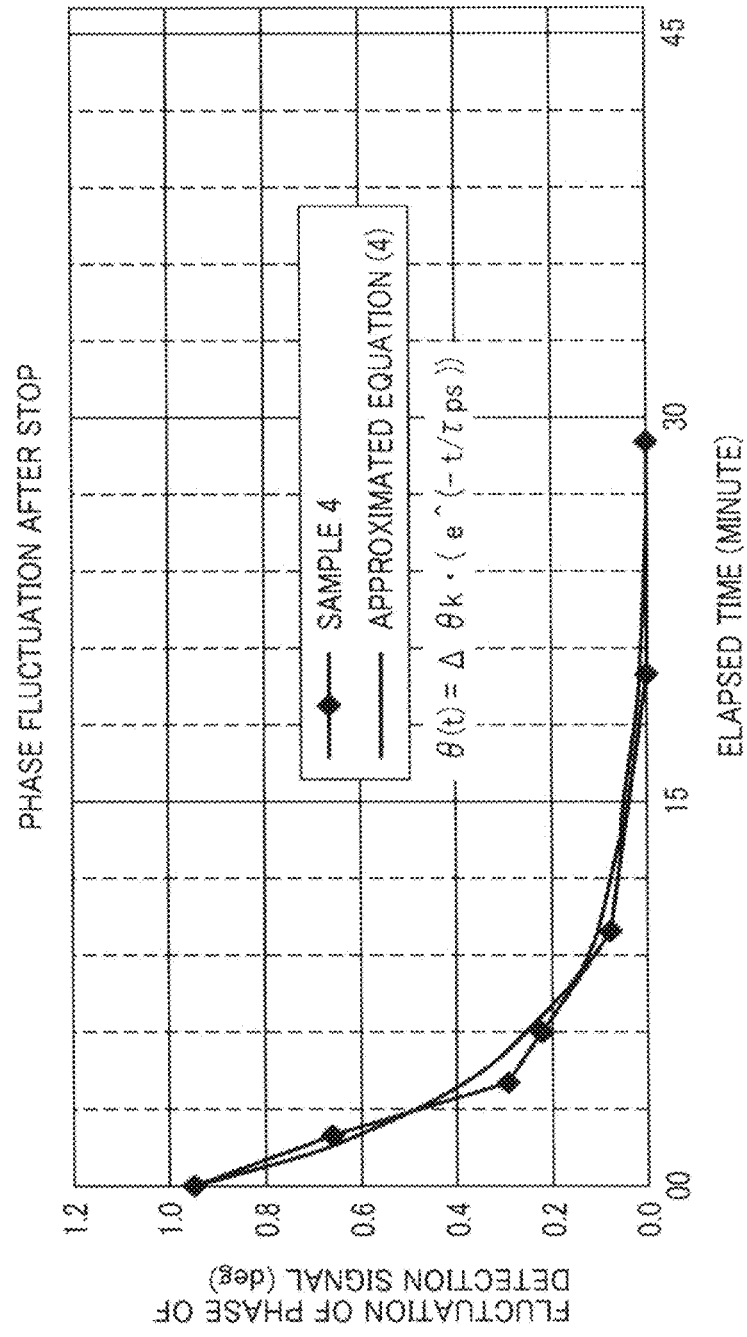
FIG. 27 is a graph showing timewise change of detection signal phase when a mirror is stopped.

As described above, property of detection signal detected by the detection-use piezoelectric element is also returnable. Specifically, after starting the operation of the mirror, the detection signal phase fluctuates as illustrated in FIG. 27, but can be returned to an initial phase after the mirror is stopped depending on the stop-time length, which means detection signal phase returns to the initial phase depending on the stop-time length of the mirror. This timewise fluctuation can be expressed by equation (4) by using the stop-time length "ts" (i.e., time length from a stop-start of mirror to a stop-end of mirror).

$$\theta(ts) = \Delta\theta k[\exp(-ts/\tau ps)] \quad (4)$$

In the above equation (4), $\Delta\theta k$ is same as the example 3. $\tau ps$ is a time constant indicating time length that the detection signal phase returns to a given value such as an initial phase after the mirror is stopped, and this could be related to property of the piezoelectric element. For example, $\tau ps=270$.

Figure 28:
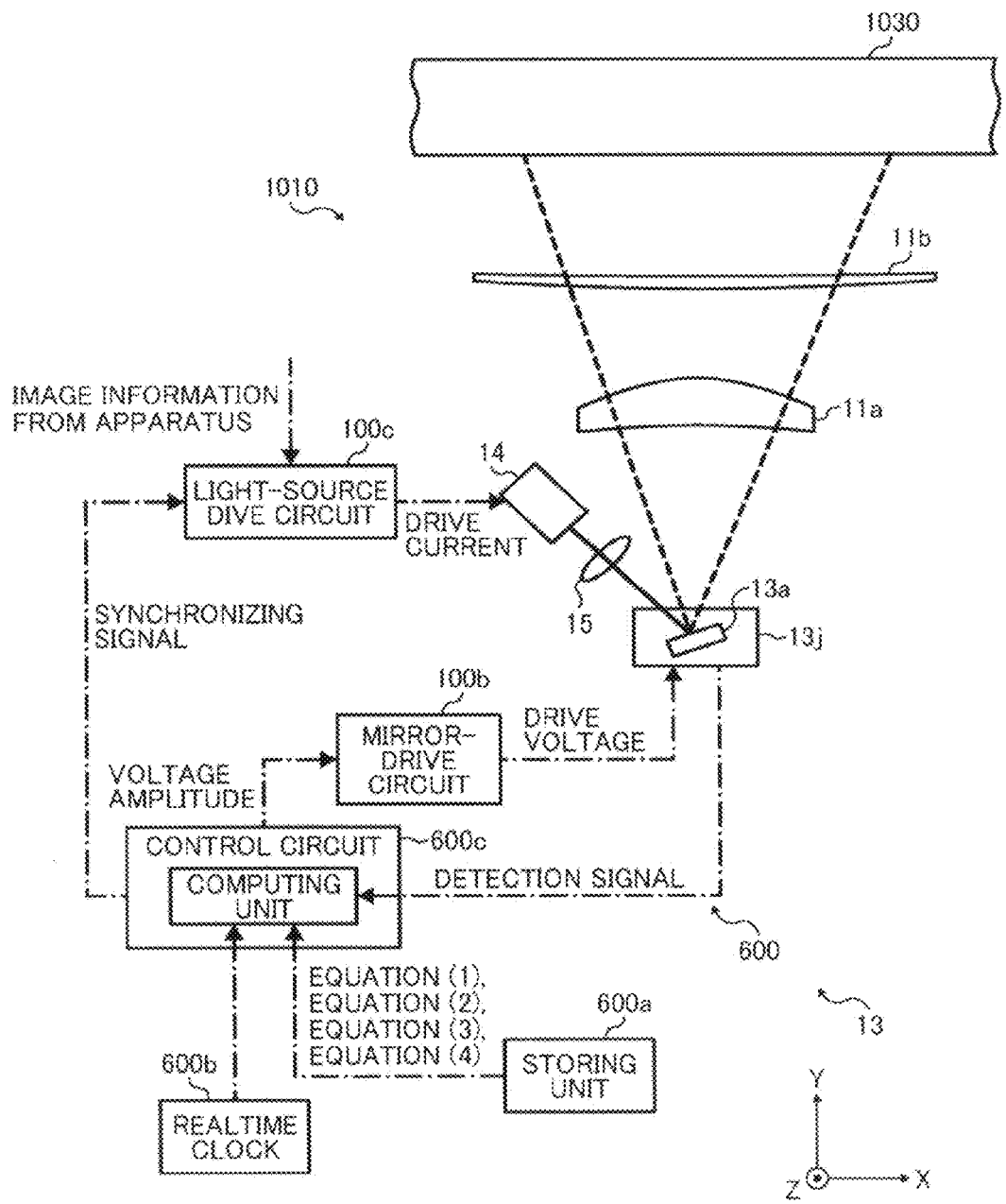
FIG. 28 is a schematic configuration of an optical scanning apparatus of example 4 of the fourth example embodiment.

As to example 4 of the fourth example embodiment shown in FIG. 28, the above equations (1), (2), (3) and (4) are stored in a storage unit 600a. The storage unit 600a stores at least $\Delta Vs$, $\tau am$, $\tau as$, $\Delta\theta k$, $\tau pm$, and $\tau ps$. Further, because the real time clock 600b can record time information, the stop-time length can be obtained based on the stop-start time (i.e., operation end time) and the stop-end time (i.e., next operation start time). Therefore, by conducting correction of detection signal phase using the equations (3) and (4) when the mirror operation is resumed after the stop of the mirror, a phase control maintaining a correct target value can be conducted. In this configuration, image light can be output by synchronizing with the corrected detection signal phase, with which higher quality image can be formed. Specifically, a deflection control unit 600 synchronizes light emission timing of a light source and applying timing of drive voltage based on the corrected detection signal phase, with which light emission timing of the light source and deflection angle about one axis of the mirror can be synchronized.

More specifically, by dividing the corrected detection signal phase $C'(tme)=C(tme)/\theta(tme)$ at the mirror operation end time (i.e., stop-start time) by $\theta(ts)$, a detection signal phase $C(ts)=C'(tme)/\theta(ts)$ at one time "ts" during the mirror stop can be obtained. Therefore, based on the detection signal phase $C(tse)=C'(tme)/\theta(tse)$ at the mirror stop-end time "tse" (i.e., next operation start time) and the above equation (3) (i.e., $\Delta\theta k$, rpm), a detection signal phase after resuming the operation can be corrected. More specifically, C(tse), which is a remaining portion of detection signal phase. is added to the detection signal phase C(tm) after resuming the mirror operation, and then divided by $\theta(tm)$, with which a corrected detection signal phase $C'(tm)=[C(tm)+C(tse)]/\theta(tm)$ after resuming the mirror operation can be obtained. In this configuration, by adding the remaining phase portion the mirror stop time, the corrected detection signal phase C'(tm) after resuming the operation can be obtained without error. Further, "tm" is reset to zero after resuming the mirror operation. Further, the correction equation is not limited to the equation (4), but other equation corresponding to the piezoelectric element property and required precision can be used for correction.

Further, as to the example 4, the storage unit 600a stores the above equations (1), (2), (3), and (4), with which in addition to an adjustment of the drive voltage phase based on the detection signal phase, an adjustment of the drive voltage amplitude based on the detection signal amplitude can be conducted.

Further, as to the example 4, the equations (1), (2), (3), and (4) are stored, but at least one of the above equations (1) and (2) is not required to be stored.

Further, as to the first to fourth example embodiments, the piezoelectric element of the unimorph structure is configured with the piezoelectric element and the cantilever, but a piezoelectric element of bimorph structure can be configured with a pair of piezoelectric elements and the cantilever attached with other. In a case of the piezoelectric element of bimorph structure, differential voltage is applied to the pair of piezoelectric elements to set expanding and shrinking directions in opposite directions, with which the cantilever can be warped greatly.

Further, as to the above described first to fourth example embodiments, the torsion bar and the cantilever being continuously connected to the torsion bar form the right angle with each other but not limited hereto. Specifically, the torsion bar and the cantilever is at least required to be crossed with each other with any configuration as long as the cantilever can be warped along a virtual plane crossing the axis line of the torsion bar.

Further, as to the above described first to fourth example embodiments, the drive-use piezoelectric element and the detection-use piezoelectric element are disposed on −X side face of the cantilever but not limited hereto. For example, one of the drive-use piezoelectric element and the detection-use piezoelectric element can be disposed on −X side face of the cantilever, and another one of the drive-use piezoelectric element and the detection-use piezoelectric element can be disposed on +X side face of the cantilever.

Further, as to the above described first to fourth example embodiments, the drive-use piezoelectric element and the detection-use piezoelectric element are arranged on −X side face of the cantilever along Z-axis direction but not limited hereto.

Further, as to the above described first to fourth example embodiments, arrangement, size, shape, number, material of each component of the optical deflection device can be changed. For example, shapes of the drive-use piezoelectric element, the detection-use piezoelectric element and the cantilever can be other than rectangular. Further, the numbers of the drive-use piezoelectric element and the detection-use piezoelectric element is not limited two, but for example, can be three or more. Further, the drive-use piezoelectric element can be smaller than the detection-use piezoelectric element. Further, the drive-use piezoelectric element and the detection-use piezoelectric element can be made of different material. Further, the deflection mirror is being continuously connected to one end of the torsion bar, which means the deflection mirror is required to be continuously connected to one part of the torsion bar. Further, the cantilever is being continuously connected to another end of the torsion bar, which means the cantilever is required to be connected to another part of the torsion bar.

Figure 29:
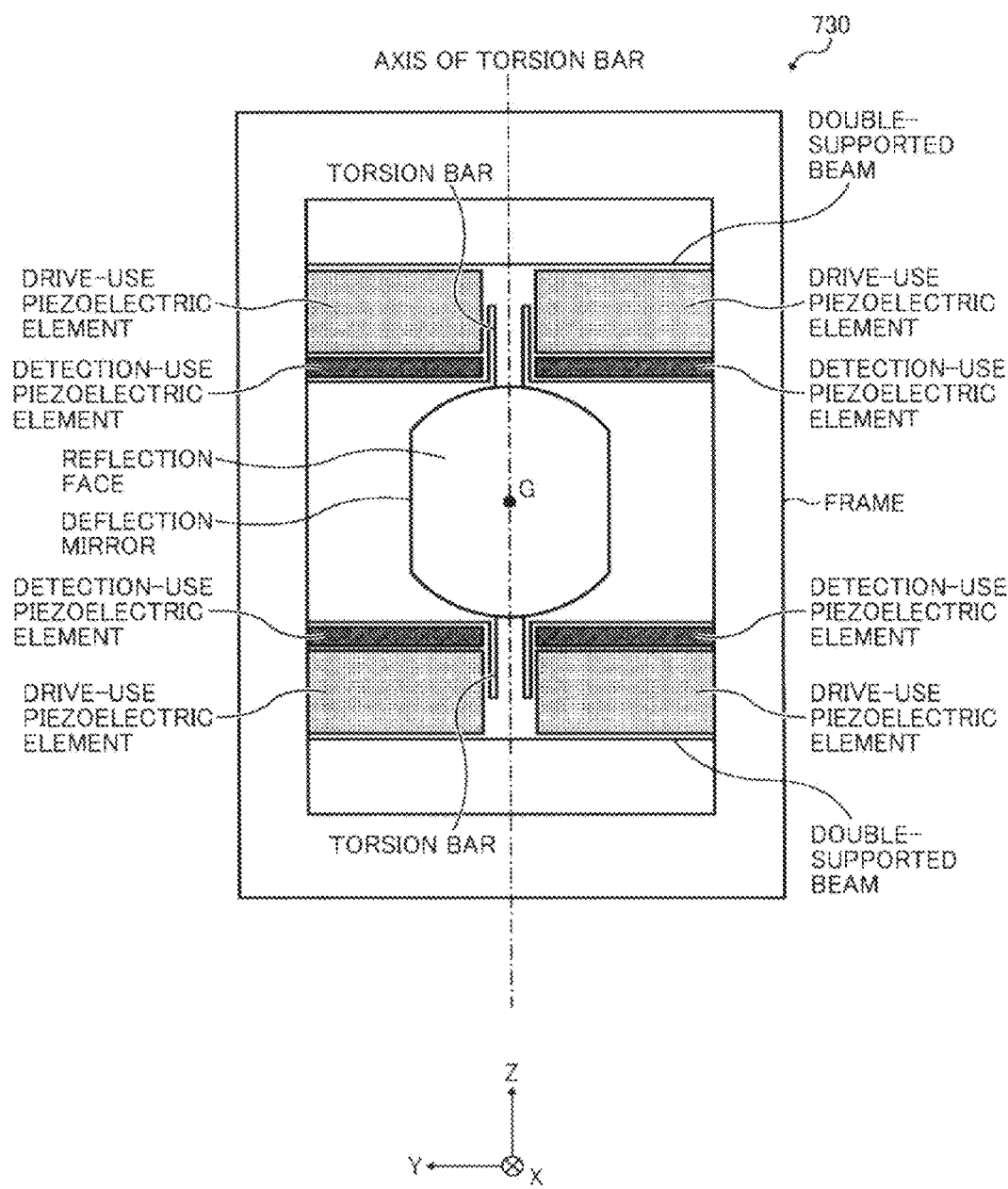
FIG. 29 is a schematic configuration of an optical deflection device of a sixth variant example.

Further, as to the above described first to fourth example embodiments, a beam or joist being continuously connected to the torsion bar is formed as the cantilever fixed at one end. Instead of this configuration, for example, an optical deflection device 730 of a sixth variant example shown in FIG. 29 can be employed, in which a beam or joist being continuously connected to the torsion bar can be formed as a double-supported beam supported by the frame at both end of Y-axis direction. As to the double-supported beam, a size in Z-axis direction at an area (i.e., center of Y-axis direction) near a continuously-connected portion with the torsion bar is set smaller than other portion of the double-supported beam. Further, a pair of the drive-use piezoelectric elements can be disposed on −X side face of the double-supported beam symmetrically with respect to a virtual plane including the axis line of the torsion bar and parallel to XZ plane, and a pair of the detection-use piezoelectric elements can be disposed on −X side face of the double-supported beam symmetrically with respect to the virtual plane. Further, the center of gravity G of the deflection mirror can be positioned on the axis line of the torsion bar.

In this configuration, opposite phase voltages can be applied to the pair of the drive-use piezoelectric elements disposed on the double-supported beam to deform in opposite directions, with which torque about the axis line can be efficiently transmitted to the torsion bar, and further the deflection mirror can be efficiently deflected or oscillated about the axis line of the torsion bar.

Further, as to the first to fourth example embodiments, the optical deflection device drives the deflection mirror 13*a* only about one axis (e.g., Z axis) but not limited hereto. For example, as to an optical deflection device 830 of a seventh variant example shown in FIG. 30, the optical deflection device 830 can drive a deflection mirror about two axes, perpendicular with each other, independently.

Figure 30:
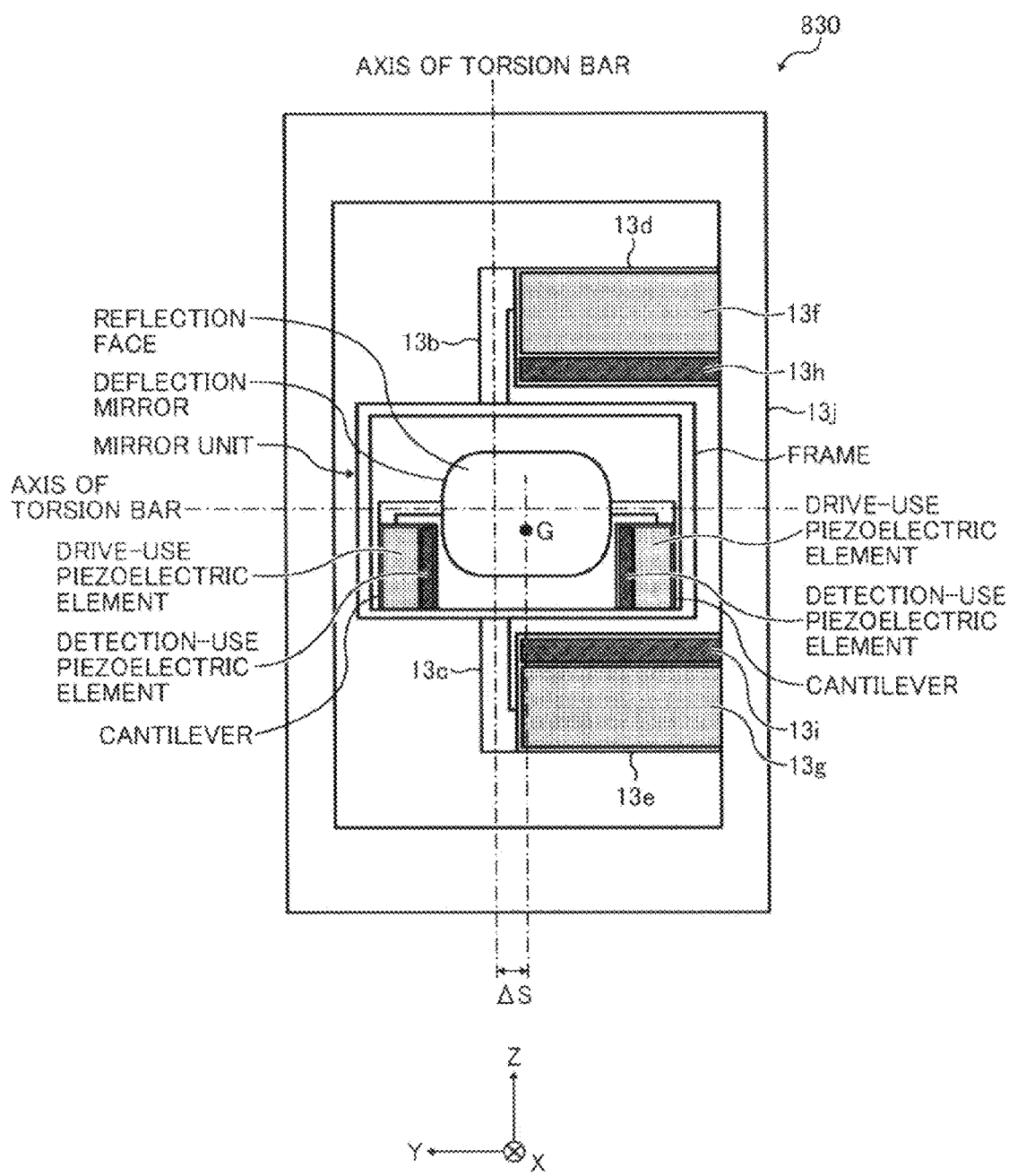
FIG. 30 is a schematic configuration of an optical deflection device of a seventh variant example.

Instead of the deflection mirror 13*a* used in the first to fourth example embodiments, in the seventh variant example shown in FIG. 30, a mirror unit having a deflection mirror is being continuously connected to a pair of the torsion bars 13*b* and 13*c*, in which the mirror unit is driven about one axis parallel to Z-axis.

The mirror unit has a configuration, which can be set by rotating the configuration of the optical deflection device of the first to fourth example embodiments for 90 degrees about X axis, in which the deflection mirror is driven about other axis perpendicular to Z axis.

In the seventh variant example, the deflection mirror can be driven (i.e., deflected or oscillated) about one axis and other axis, perpendicular to each other, independently. In this configuration, drive voltage for driving the deflection mirror about one axis and other axis can be corrected as same as the examples of the above fourth example embodiment.

In the seventh variant example, laser beam from a light source can be deflected to a scanned face by the optical deflection device 830, with which the scanned face can be two-dimensionally scanned to form an image.

Further, the scanned face can be a surface of a member that can pass or reflect laser beam, and a semi-translucent member can be disposed on a light path of laser beam via the scanned face, in which a virtual image of an image formed on the scanned face can be viewed via the semi-translucent member. Such configuration can be used, for example, as a headup display or a head-mount display. Further, vehicles having such configured headup display can be provided.

Further, in the seventh variant example, as illustrated in FIG. 30, the center of gravity G of the deflection mirror is positioned at a position deviated from the axis line of the torsion bar extending along other axis direction perpendicular to Z axis, but the center of gravity G of the deflection mirror can be positioned on the axis line of the torsion bar. Further, in the seventh variant example, as illustrated in FIG. 30, the center of gravity G of the deflection mirror is positioned at a position deviated from the axis line of the torsion bar extending along one axis direction parallel to Z-axis direction, but the center of gravity G of the deflection mirror can be positioned on the axis line of the torsion bar.

Further, as to the above described first, second and fourth example embodiments, the photoconductor drum 1030 is used as an image carrying member but not limited hereto. For example, a belt photoconductor can be used as the image carrying member.

Further, as to the above described first, second and fourth example embodiments, a toner image formed on the photoconductor drum 1030 is directly transferred to a recording sheet but not limited hereto. For example, a toner image formed on the photoconductor drum 1030 can be transferred to a recording sheet via a transfer member.

Further, as to the above described first, second and the fourth example embodiments, the laser printer 1000 is used as an example of an image forming apparatus but not limited hereto. Any image forming apparatuses having the optical scanning unit 1010 can be used as the image forming apparatus of the above described one or more example embodiments.

Further, the image forming apparatus according to the above described one or more example embodiment can use a configuration to irradiate a laser beam to a medium such as a sheet that can generate color by laser beam irradiation.

Further, the image forming apparatus according to the above described one or more example embodiment can use silver film as the image carrying member, in which a latent image is formed on the silver film by an optical scanning, and the latent image can be developed using a development process of silver-halide photo processing. Then, the latent image can be printed on printing paper using a photo-printing process of silver-halide photo processing. Such image forming apparatus can be applied to an optical plate-use machine, and an optical drawing machine that draws computer tomographic (CT) scanning image.

Figure 31:
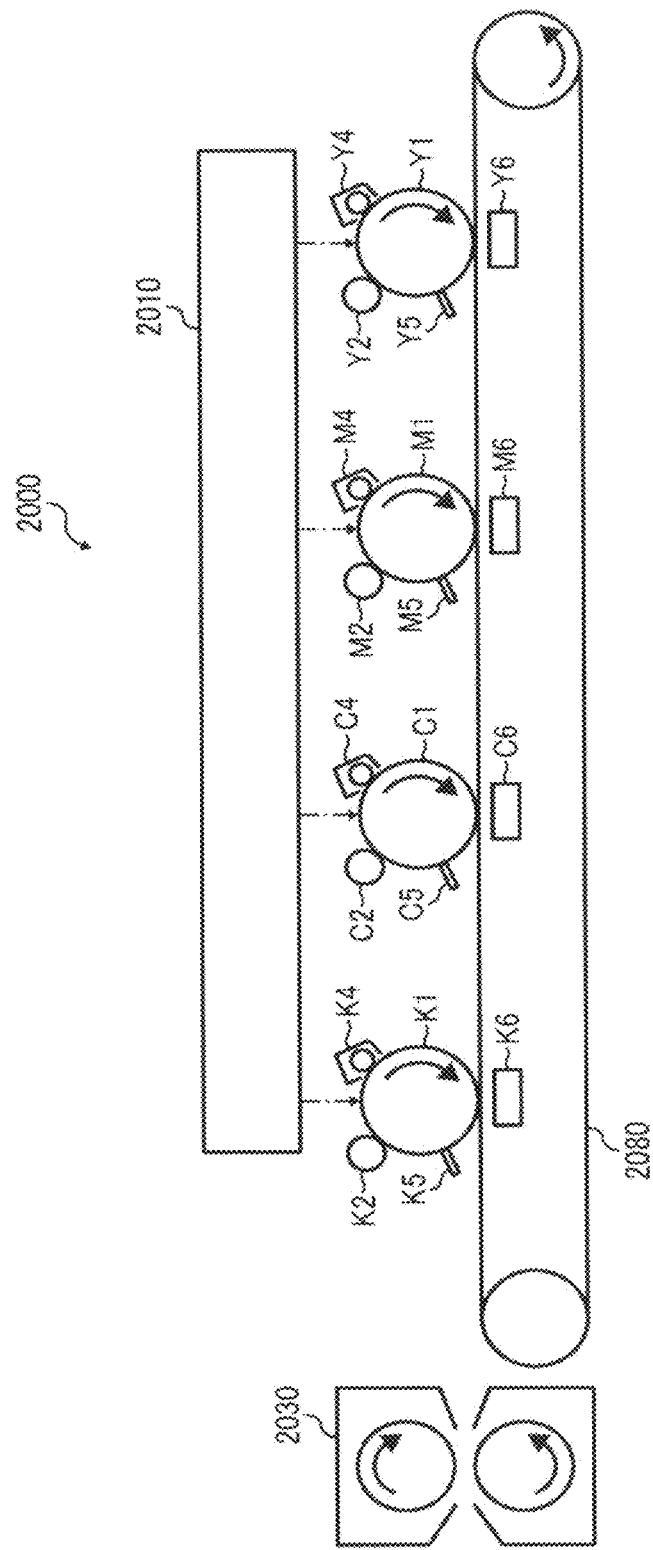
FIG. 31 is a schematic view of a color printer.

Further, the image forming apparatus according to the above described one or more example embodiment can be, for example, a color printer 2000 having a plurality of photoconductor drums as illustrated in FIG. 31.

The color printer 2000 is a multi-color printer of tandem type that can form a full color image by superimposing four color (black, cyan, magenta, yellow) images. The color printer 2000 includes, for example, a black station (photoconductor drum K1, charger K2, development unit K4, cleaning unit K5, and transfer unit K6), a cyan station (photoconductor drum C1, charger C2, development unit C4, cleaning unit C5, and transfer unit C6), a magenta station (photoconductor drum M1, charger M2, development unit M4, cleaning unit M5, and transfer unit M6), a yellow station (photoconductor drum Y1, charger Y2, development unit Y4, cleaning unit Y5, and transfer unit Y6), an optical scanning apparatus 2010, a transfer belt 2080, and a fusing unit 2030.

Each of the photoconductor drums rotates in a direction shown by an arrow in FIG. 31, and the charger, the development unit, the transfer unit, and the cleaning unit are disposed along the rotation direction of the photoconductor drum. The charger charges a surface of the corresponding photoconductor drum uniformly. The optical scanning apparatus 2010 irradiates laser beams to the surface of each photoconductor drum charged by the charger to form a latent image on each of the photoconductor drums. Then, a toner image is formed on the surface of each of the photoconductor drums by the corresponding development unit. Then, toner images of each of colors are transferred on a recording sheet being on the transfer belt 2080 by the corresponding transfer unit, and the fusing unit 2030 fuses an image on the recording sheet finally.

The optical scanning apparatus 2010 includes a light source unit similar to the above described light source unit for each color. Therefore, the optical scanning apparatus 2010 can devise the same effect of the above described optical scanning unit 1010. Further, because the color printer 2000 includes the optical scanning apparatus 2010, the color printer 2000 can devise the same effect of the laser printer 1000.

Further, as to the above described first to fourth example embodiments, the configuration of the support member can be changed as required.

Further, as to the above described first to fourth example embodiments, the light source is a laser diode such as an edge emitting laser but not limited hereto. For example, the light source can be a surface emitting laser, and other light source not using laser.

Further, as to the above described first to fourth example embodiments, the optical deflection device can be applied, for example, to a bar code scanner, a laser radar, or the like.

As to the above described example embodiments, a deflection angle of a mirror can be detected without deterioration of flatness of a reflection face of a mirror.

Numerous additional modifications and variations are possible in light of the above teachings. It is therefore to be understood that, within the scope of the appended claims, the disclosure of the present invention may be practiced otherwise than as specifically described herein. For example, elements and/or features of different examples and illustrative embodiments may be combined each other and/or substituted for each other within the scope of this disclosure and appended claims.

What is claimed is:

1. An optical deflection device, comprising:
a mirror having a reflection face to deflect light that enters the reflection face; and
a support member to support the mirror including:
a torsion bar having one end being continuously connected to the mirror;
a beam being continuously connected to another end of the torsion bar;
a plurality of piezoelectric elements disposed on the beam including a first piezoelectric element to deflect the mirror and a second piezoelectric element to detect a deflection angle of the mirror; and
a control unit that applies drive voltage to the first piezoelectric element,
wherein the control unit includes:
an operation time measurement unit to measure operation time of the minor;
a storage unit to store timewise coefficient of fluctuation of detection voltage occurred to the second piezoelectric element when the drive voltage is applied to the first piezoelectric element and a time constant related to the detection voltage; and
an adjustment unit to correct the detection voltage based on the operation time, the timewise coefficient of fluctuation and the time constant, and adjusts the drive voltage based on the corrected detection voltage, and
wherein when the operation time is set as tm, timewise coefficient of fluctuation of amplitude of the detection voltage is set as $\Delta Vk$, time constant related to amplitude of the detection voltage is set as $\tau am$, amplitude of the detection voltage during the mirror operation is set as $A(tm)$, and amplitude after the correction is set as $A'(tm)$, where $A'(tm)=A(tm)/[1+\Delta Vk \times [1-\exp(-tm/\tau am)]]$ is established.

2. The optical deflection device of claim 1, wherein the beam is a cantilever having a free end being continuously connected to another end of the torsion bar.

3. The optical deflection device of claim 1, wherein the operation time measurement unit is a real time clock that measures stop-time length "ts" of the mirror,
the storage unit stores time constant $\tau as$ related to change of amplitude of the detection voltage during stop of the mirror,
the adjustment unit computes amplitude of the detection voltage when the mirror stop ends based on the corrected amplitude $A'(tme)$ when the minor-stop start time "tme," the $\tau as$ and the $\Delta Vk$, and the adjustment unit corrects amplitude of the detection voltage after resuming the mirror operation based on the computed amplitude.

4. The optical deflection device of claim 3, wherein when amplitude of the detection voltage during stop of the mirror is set as $A(ts)$, where $A(ts)=A'(tme)/[1+\Delta Vk \times \exp(-ts/\tau as)]$ is established.

5. The optical deflection device of claim 1, wherein when the operation time is set as tm, timewise coefficient of fluctuation of phase of the detection voltage is set as $\Delta\theta k$, time constant of phase of the detection voltage is set as $\tau pm$, phase of the detection voltage is set as C(tm), and phase after-the-correction is set as C'(tm), where C'(tm)=C(tm)/[$\Delta\theta k \times$[1−exp(−tm/$\tau pm$)]] is established.

6. The optical deflection device of claim 5, wherein the operation time measurement unit is a real time clock that measures stop-time length "ts" of the mirror,
the storage unit stores time constant $\tau ps$ related to change of phase of the detection voltage during stop of the mirror,
the adjustment unit computes phase of the detection voltage when the mirror-stop ends based on the corrected phase C'(tme) when the mirror-stop start time "tme," the $\tau ps$, and the $\Delta\theta k$, and the adjustment until corrects phase of the detection voltage after resuming the mirror operation based on the computed phase.

7. The optical deflection device of claim 6, wherein when phase of the detection voltage during stop of the mirror is set as C(ts), where C(ts)=C'(tme)/[$\Delta\theta k$[exp(−ts/$\tau ps$)]] is established.

8. The optical deflection device of claim 1, wherein the plurality of piezoelectric elements is arranged along a direction parallel to the axis line of the torsion bar.

9. The optical deflection device of claim 1, wherein the second piezoelectric element on the beam is disposed at a position close to a continuously-connected portion of the beam and the torsion bar.

10. The optical deflection device of claim 9, wherein the second piezoelectric element is disposed on the beam while crossing a given plane including the axis line of the torsion bar.

11. The optical deflection device of claim 10, wherein the second piezoelectric element has a first portion not crossing the given plane, and a second portion crossing the given plane, and a size of the second portion in a direction parallel to the axis line of the torsion bar is longer than a size of the first portion in the direction parallel to the axis line of the torsion.

12. The optical deflection device of claim 9, further comprising a wiring wired along the torsion bar and connected to the second piezoelectric element.

13. The optical deflection device of claim 9, wherein the second piezoelectric element is smaller than the first piezoelectric element.

14. The optical deflection device of claim 1, wherein the center of gravity of the mirror is positioned at a position deviated from the axis line of the torsion bar.

15. The optical deflection device of claim 1, wherein the second piezoelectric element is deformed by a deflection of the mirror and generates a detection voltage corresponding to the deflection angle of the mirror.

16. The optical deflection device of claim 15, wherein the deflection angle of the mirror is detected based on the detection voltage.

17. An optical deflection device, comprising:
a mirror having a reflection face to deflect light that enters the reflection face; and
a support member to support the mirror including:
a torsion bar having one end being continuously connected to the mirror;
a beam being continuously connected to another end of the torsion bar;
a plurality of piezoelectric elements disposed on the beam including a first piezoelectric element to deflect the mirror and a second piezoelectric element to detect a deflection angle of the mirror, and
a control unit that applies drive voltage to the first piezoelectric element,
wherein the control unit includes:
an operation time measurement unit to measure operation time of the mirror;
a storage unit to store timewise coefficient of fluctuation of detection voltage occurred to the second piezoelectric element when the drive voltage is applied to the first piezoelectric element and a time constant related to the detection voltage; and
an adjustment unit to correct the detection voltage based on the operation time, the timewise coefficient of fluctuation and the time constant, and adjusts the drive voltage based on the corrected detection voltage, and
wherein when the operation time is set as, timewise coefficient of fluctuation of phase of the detection voltage is set as $\Delta\theta k$, time constant of phase of the detection voltage is set as $\tau pm$, phase of the detection voltage is set as C(tm), and phase after-the-correction is set as C'(tm), where C'(tm)=C(tm)/[$\Delta\theta k \times$[1−exp(−tm/$\tau pm$)]] is established.

* * * * *